US006216098B1

(12) United States Patent
Clancey et al.

(10) Patent No.: US 6,216,098 B1
(45) Date of Patent: Apr. 10, 2001

(54) SIMULATING WORK BEHAVIOR

(75) Inventors: William J. Clancey, Portola Valley, CA (US); David M. Torok, Philadelphia, PA (US); Maarten Sierhuis, Fremont, CA (US); Ron J. J. van Hoof, Greenwich, CT (US); Patricia Sachs, Half Moon Bay, CA (US)

(73) Assignees: Institute for Research on Learning, Menlo Park, CA (US); Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/187,549

(22) Filed: Nov. 5, 1998

Related U.S. Application Data

(63) Continuation of application No. 08/846,615, filed on Apr. 30, 1997, now abandoned.

(51) Int. Cl.$^7$ .............................. G06G 7/48; G06F 9/455
(52) U.S. Cl. .................................................. 703/6
(58) Field of Search ................... 703/6; 706/11, 706/45, 46; 345/326

(56) References Cited

U.S. PATENT DOCUMENTS

| | | |
|---|---|---|
| 4,009,525 | 3/1977 | Hollander . |
| 4,604,718 | 8/1986 | Norman et al. . |
| 4,965,743 | 10/1990 | Malin et al. . |
| 5,140,537 | 8/1992 | Tullis . |
| 5,241,465 | 8/1993 | Oba et al. . |
| 5,319,579 | 6/1994 | Lipner . |
| 5,331,579 | 7/1994 | Maguire, Jr. et al. . |
| 5,339,256 | 8/1994 | Levy et al. . |
| 5,412,756 | 5/1995 | Bauman et al. . |

(List continued on next page.)

OTHER PUBLICATIONS

Bird et al., "Modeling belief and reference in multi–agent support systems," May 1996, pp. 486–489.

Burstein, M.H., et al., (1993) "A Simulation Development tool for Evaluating Coordination Strategies in Organizations," *AI and Theories of Groups and Organization*, 1993 Workshop Program Notes, pp. 24–28.

(List continued on next page.)

*Primary Examiner*—Kevin J. Teska
*Assistant Examiner*—Lonnie A. Knox
(74) *Attorney, Agent, or Firm*—Fish & Richardson P.C.

(57) ABSTRACT

Methods and apparatus for modeling behavior. A computer model includes an agent having one or more beliefs, a world model, and facts. Behavior is modeled by frames including workframes modeling a time-consuming portions of an activity or thoughtframes modeling non-time-consuming portions of an activity or information processing. Detectables model acquisition of, and response to, information during a defined portion of an activity. A detectable tests facts to form beliefs of the agent, which can affect continued performance of the activity. The model is run by selecting for each time one of the frames to be the working frame; maintaining a context of active frames representing activities that are underway at any time; performing the working frame until it completes or another frame is selected to be performed in its place. Another frame may be selected when a detectable effect causes an impasse in the working frame or completes or aborts the working frame, or a higher-priority frame interrupts the working frame. In another aspect, the invention provides the services of an intelligent agent. An agent model models a user with a general component modeling an idealized agent having the role or tasks of the user and a situation-specific component describing the state and the beliefs of the user. The agent model is run under the control of a comparator process both in a forward-looking mode to generate predictions and in an explanatory mode to compare predictions generated by the agent model with actions of the user.

48 Claims, 24 Drawing Sheets

U.S. PATENT DOCUMENTS

| | | | | |
|---|---|---|---|---|
| 5,696,916 | * | 12/1997 | Yamazaki et al. ................... | 345/356 |
| 5,734,795 | * | 3/1998 | Rogers ................................... | 706/45 |
| 5,819,243 | * | 10/1998 | Rich et al. ............................. | 706/11 |

OTHER PUBLICATIONS

Carley, K., et al., "Agent Honesty, Cooperation and Benevolence in an Artificial Organization," *AI and Theories of Groups and Organization*, 1993 Workshop Program Notes, pp. 1–7.

Carson et al., "Modeling organizations as a social network of distributed knowledge–based systems," Nov. 1990, pp. 271–279.

Clancey, W.J., et al., (1993) "Formal Modeling for Work System Design," Institute for Research on Learning, presented at Workshop of the AAAI National Conference, Washington D.C. pp. 1–7.

Clancey, W.J., (1985) "Acquiring, Representing and Evaluating a Competence Model of Diagnostic Strategy," Institute for Research on Learning, Palo Alto, CA, pp. 1–81.

Drogoul, Alexis et al., (1993) "Multi–agent simulation as a tool for studying emergent processes in societies," *Simulating Societies*, pp. 53–76.

Gilbert, N. and Doran, J., (1993) "Simulating Societies—an Introduction," *Simulating Societies*, pp. 1–23.

Gustavsson, R., "Societies of Computation—A Framework—" *AI and Theories of Groups and Organization*, 1993 Workshop Program Notes, pp. 96–102.

Hayes–Roth, B., (1985) "A Blackboard Architecture for Control," *Artificial Intelligence*, 26: pp. 251–321.

Hayes–Roth, B., et al., (1995) "Directed Improvisation by Computer Characters," *Knowledge Systems Laboratory Report No. KSL 95–04*.

Hayes–Roth, B., (1990) "Architectural Foundations for Real–Time Performance in Intelligent Agents," *J. Real–Time Systems* 2:99–125.

Kunz, J.C., et al., "Modeling Effects of Organizational Structure and Communication Tools on Design Team Productivity," *AI and Theories of Groups and Organization*, 1993 Workshop Program Notes, pp. 69–75.

Latimer et al., "A model of structured discourse for cooperating intelligent agents," May 1996, pp. 191–200.

Nakashima, H., et al., "Organic Programming Language GAEA for Multi–Agents," *GAEA programming manual*, pp 236–243.

Nii, H. Penny, (1986) "Blackboard Systems," *AI Magazine* 7(3 & 4): 38–107.

Radya, A., (1987) "Logic programming and discrete event simulation," *Simulation and AI. Simulation Series*, 18(3), pp. 64–71.

Radiya, A., et al., (1987) "ROBS: Rules and Objects based Simulation," *Department of Industrial Engineering and Operations Research*, Simulation Research Group, Syracuse University, Syracuse, NY, pp. 1–71.

Tambe, M., et al., (1995) "Intelligent Agents for Interactive Simulation Environments," *AI Magazine*, 15–39.

Providing a Holistic Model of Work for Work Systems Design, NYNEX Science and Technology, Inc. NY, 1–13.

Torok, D.M, "Providing a Holistic Model Work for Work Systems Design," NYNEX Science & Technology, presented at the International Engineering Consortium, 153–168.

Tyo, J., (1995) "Simulation Modeling Tools," *Informationweek* 60–67.

Wenger, E., (1987) "Artificial Intelligence and Tutoring Systems, Computational and Cognitive Approaches to the Communication of Knowledge," University of California, Morgan Kaufmann Pub., Los Angeles, CA, pp. 139 and 141.

* cited by examiner

FIG. 9 NOTATION CONVENTIONS (Backus Naur Form)

| Construct | Interpretation |
|---|---|
| ::= * + {} [] \| . | Symbols part of the BNF formalism |
| X ::= Y | The syntax of X is defined by Y |
| {X} | Zero or one occurrence of X |
| X* | Zero or more occurrences of X |
| X+ | One or more occurrences of X |
| X \| Y | One of X or Y (exclusive or) |
| [X] | Grouping construct for specifying scope of operators, e.g., [X \| Y] or [X]* |
| symbol | Predefined terminal symbol of the language |
| *symbol* | User-defined terminal symbol of the language |
| symbol | Non-terminal symbol |

SYNTAX OF IDENTIFIERS (ID)

| | |
|---|---|
| name | ::= letter [ letter \| digit \| '-' ]* |
| letter | ::= 'a' \| 'b' \|...\| 'z' \| 'A' \| 'B' \|...\| 'Z' \| '_' |
| digit | ::= '0' \| '1' \|...\| '9' |
| special-character | ::= '.' \| ',' \| ';' \| ':' |
| blank-character | ::= blank space \| tab \| newline |
| number | ::= integer \| float |
| integer | ::= { ± \| - } unsigned |
| unsigned | ::= [ digit ]+ |
| float | ::= integer.unsigned |
| truth-value | ::= true \| false |
| literal-string | ::= " [ letter \| digit \| special-character \| blank-character ]* " |
| literal-value | ::= name |

FIG. 10  SYNTAX OF A MODEL (MOD)

| | | |
|---|---|---|
| model | ::= | model model-name :<br>[ import model-name ; ]*<br>[ GRP.group \| AGT.agent \| CLS.object-class \|<br>OBJ.object \| COC.conceptual-object-class \|<br>COB.conceptual-object \| ADF.area-def \| ARE.area \|<br>PAT.path ]*<br>end {;} |
| model-name | ::= | ID.name |

FIG. 11  SYNTAX OF AN AGENT (AGT)

| | | |
|---|---|---|
| agent | ::= | agent agent-name { GRP.group-membership } :<br>{display-text = ID.literal-string ; }<br>{cost = ID.number ; }<br>{time-unit = ID.number ; }<br>{ location = ARE.area-name ; }<br>{ GRP.attributes }<br>{ GRP.relations }<br>{ GRP.initial-beliefs }<br>{ GRP.initial-facts }<br>{ GRP.activities }<br>{ GRP.workframes }<br>{ GRP.thoughtframes }<br>end {;} |
| agent-name | ::= | ID.name |

FIG. 12 SYNTAX OF A GROUP (GRP)

| | | |
|---|---|---|
| group | ::= | group group-name {group-membership } :<br>{ display-text =     ID.literal-string ; }<br>{ cost =     ID.number ; }<br>{ time-unit =     ID.number ; }<br>{ attributes }<br>{ relations }<br>{ initial-beliefs }<br>{ initial-facts }<br>{ activities }<br>{ workframes }<br>{ thoughtframes }<br>end { ; } |
| group-name | ::= | ID.name |
| group-membership | ::= | member-of group-name [ , group-name ]* |
| attributes | ::= | attributes : [ ATT.attribute ]* |
| relations | ::= | relations : [ REL.relation ]* |
| initial-beliefs | ::= | initial-beliefs : [ BEL.initial-belief ]* |
| initial-facts | ::= | initial-facts : [ FCT.initial-fact ]* |
| activities | ::= | activities : [ activity ]* |
| activity | ::= | CAC.composite-activity \|<br>PAC.primitive-activity \|<br>MOV.move-activity \|<br>COA.create-object-activity \|<br>COM.communicate-activity \|<br>BCT.broadcast-activity |
| workframes | ::= | workframes : [ WFR.workframe ]* |
| thoughtframes | ::= | thoughtframes : [ TFR.thoughtframe ]* |

FIG. 13 SYNTAX OF AN OBJECT CLASS (CLS)

| | | |
|---|---|---|
| object-class | ::= | object-class object-class-name {class-inheritance }﹔<br>{display-text = ID.literal-string ﹔ }<br>{cost = ID.number ﹔ }<br>{time-unit = ID.number ﹔ }<br>{resource = ID.truth-value ﹔ }<br>{GRP.attributes }<br>{GRP.relations }<br>{GRP.initial-beliefs }<br>{GRP.initial-facts }<br>{GRP.activities }<br>{GRP.workframes }<br>end {﹔ } |
| object-class-name | ::= | ID.name |
| class-inheritance | ::= | extends object-class-name [ ﹐ object-class-name ]* |

FIG. 14 SYNTAX OF AN OBJECT (OBJ)

| | | |
|---|---|---|
| object | ::= | object object-name<br>instance-of object-class-name<br>{COB.conceptual-object-membership }﹔<br>{display-text = ID.literal-string ﹔ }<br>{cost = ID.number ﹔ }<br>{time-unit = ID.number ﹔ }<br>{resource = ID.truth-value ﹔ }<br>{ location = ARE.area-name ﹔ }<br>{GRP.attributes }<br>{GRP.relations }<br>{GRP.initial-beliefs }<br>{GRP.initial-facts }<br>{GRP.activities }<br>{GRP.workframes }<br>end {﹔ } |
| object-name | ::= | ID.name |

FIG. 15 SYNTAX OF A CONCEPTUAL OBJECT CLASS (COC)

object-class      ::=   conceptual-object-class conceptual-object-class-name :
                            { display-text = ID.literal-string ; }
                            { GRP.relations }
                            end { ; } conceptual-object-class-name   ::=   ID.name

FIG. 16 SYNTAX OF A CONCEPTUAL OBJECT (COB)

conceptual-object   ::=   conceptual-object conceptual-object-name
                           instance-of conceptual-object-class-name
                           { conceptual-object-membership } :
                           { display-text = ID.literal-string ; }
                           { GRP.relations }
                           end { ; } conceptual-object-name   ::=   ID.name conceptual-object-membership   ::=   part-of conceptual-object-name
                                                 [ , conceptual-object-name ]*

FIG. 17 SYNTAX OF AN ATTRIBUTE (ATT)

| | | |
|---|---|---|
| attribute | ::= | { private \| protected \| public }<br>type-def attribute-name ; |
| attribute-name | ::= | ID.name |
| type-def | ::= | class-type-def \| value-type-def |
| class-type-def | ::= | GRP.group-name \| agent \| CLS.object-class-name \|<br>COC.conceptual-object-class-name \|<br>ADF.area-def-name |
| value-type-def | ::= | int \| float \| symbol \| boolean \| string |

FIG. 18 SYNTAX OF A RELATION (REL)

| | | |
|---|---|---|
| relation | ::= | {private \| protected \| public }<br>ATT.class-type-def relation-name ; |
| relation-name | ::= | ID.name |

FIG. 19 SYNTAX OF AN INITIAL-BELIEF (BEL)

| | | |
|---|---|---|
| initial-belief | ::= | ( [ value-expression | relational-expression ] ) |
| value-expression | ::= | obj-attr evaluation-operator value \| <br> obj-attr equality-operator object-ref |
| equality-operator | ::= | = \| != |
| evaluation-operator | ::= | BEL.equality-operator \| ≥ \| >= \| ≤ \| <= |
| obj-attr | ::= | the ATT.attribute-name of object-ref |
| object-ref | ::= | AGT.agent-name \| OBJ.object-name \| <br> VAR.variable-name \| PAC.param-name \| <br> ARE.area-name \| current |
| value | ::= | ID.literal-string \| ID.number \| PAC.param-name |
| relational-expression | ::= | object-ref REL.relation-name object-ref <br> { is ID.truth-value } |

FIG. 20 SYNTAX OF AN INITIAL-FACT (FCT)

| | | |
|---|---|---|
| initial-fact | ::= | ( [ BEL.value-expression \| BEL.relational-expression ] ) |

FIG. 21 SYNTAX OF A WORKFRAME (WFR)

| | | |
|---|---|---|
| workframe | ::= | workframe-name :<br>{ display-text =    ID.literal-string ; }<br>{ repeat =    ID.truth-value ; }<br>{ priority =    ID.unsigned ; }<br>{ variable-decl }<br>{ detectable-decl }<br>{ [ precondition-decl workframe-body-decl ] \|<br>   workframe-body-decl }<br>end { ; } |
| workframe-name | ::= | ID.name |
| variable-decl | ::= | variables : [ VAR.variable ; ]* |
| detectable-decl | ::= | detectables : [ DET.detectable ]* |
| precondition-decl | ::= | when ( [ PRE.precondition ] [ and<br>PRE.precondition ]* ) |
| workframe-body-decl | ::= | do [ workframe-body-element ; ]*<br>end ; |
| workframe-body-element | ::= | PAC.activity-ref \| CON.consequence |

FIG. 22 SYNTAX OF A THOUGHTFRAME (TFR)

```
thoughtframe              ::= thoughtframe-name :
                                 { display-text =  ID.literal-string ; }
                                 { repeat =        ID.truth-value ; }
                                 { WFR.variable-decl }
                                 { WFR.precondition-decl thoughtframe-body-decl }
                                 end { ; } thoughtframe-name         ::= ID.name thoughtframe-body-decl    ::= do [ thoughtframe-body-element ; ]*
                                 end ;

thoughtframe-body-element ::= CON.consequence
```

FIG. 23 SYNTAX OF A COMPOSITE ACTIVITY (CAC)

```
composite-activity ::= composite-activity PAC.activity-name
                         ( { PAC.param-decl [ , PAC.param-decl ] * } ) :
                         { display-text =  ID.literal-string ; }
                         { priority =      [ ID.unsigned | PAC.param-name ] ; }
                         { end-condition = [ detectable | no-work ] ; }
                         { WFR.detectable-decl }
                         { GRP.activities }
                         { GRP.workframes }
                         { GRP.thoughtframes }
                         end { ; }
```

FIG. 24 SYNTAX OF A PRIMITIVE ACTIVITY (PAC)

| | | |
|---|---|---|
| primitive-activity | ::= | primitive-activity activity-name<br>( {param-decl [ , param-decl ]* } ) :<br>{ display-text =     ID.literal-string \| param-name ; }<br>{ priority =         [ ID.unsigned \| param-name ] ; }<br>{ random =        [ ID.truth-value \| param-name ] ; }<br>{ min-duration = [ ID.unsigned \| param-name ] ; }<br>{ max-duration = [ ID.unsigned \| param-name ] ; }<br>{ touched-objects }<br>end { ; } |
| activity-name | ::= | ID.name |
| param-decl | ::= | param-type param-name |
| param-type | ::= | ATT.type-def \| list-of ATT.type-def |
| param-name | ::= | ID.name |
| touched-objects | ::= | touched-objects : [ param-name \| OBJ.object-name ]<br>[ , [ param-name \| OBJ.object-name ] ]* ; |
| activity-ref | ::= | activity-name ( {param-expr [ , param-expr ]* } ) ; |
| list-expr | ::= | ( param-expr [ , param-expr ]* ) |
| param-expr | ::= | GRP.group-name \| AGT.agent-name \|<br>CLS.object-class-name \| OBJ.object-name \|<br>COC.conceptual-object-class-name \|<br>COB.conceptual-object-name \| VAR.variable-name \|<br>ID.number \| ID.literal-string \| ARE.area-name \|<br>ID.literal-symbol \| ID.truth-value \| list-expr |

FIG. 25 SYNTAX OF A CREATE OBJECT ACTIVITY (COA)

```
create-object-activity
    ::= create-object PAC.activity-name ( { PAC.param-decl
            [ , PAC.param-decl ]* } ) :
        { display-text =   ID.literal-string ; }
        { priority =       [ ID.unsigned | PAC.param-name ] ; }
        { random =         [ ID.truth-value | PAC.param-name ] ; }
        { min-duration =   [ ID.unsigned | PAC.param-name ] ; }
        { max-duration =   [ ID.unsigned | PAC.param-name ] ; }
        { PAC.touched-objects }
        action =       [ new | copy | PAC.param-name ] ;
        source =       [ CLS.object-class-name | OBJ.object-name |
                         PAC.param-name ];
        destination =  [CLS.object-class-name | OBJ.object-name |
                         PAC.param-name ] ;
        { destination-location = [ ARE.area-name | PAC.param-name ] ; }
        { destination-conceptual-object = [ COB.conceptual-object-name |
                PAC.param-name ] [ , [ COB.conceptual-object-name |
                PAC.param-name ] ] ; }
        { when = [ start | end | PAC.param-name ] ; }
        end { ; }
```

FIG. 26 SYNTAX OF A MOVE ACTIVITY (MOV)

```
move-activity      ::=  move PAC.activity-name ( { PAC.param-decl
                        [ , PAC.param-decl ]* } ) :
                    {display-text =  ID.literal-string ; }
                    {priority =      [ ID.unsigned | PAC.param-name ] ; }
                    {random =        [ ID.truth-value | PAC.param-name ] ; }
                    {min-duration =  [ ID.unsigned | PAC.param-name ] ; }
                    {max-duration =  [ ID.unsigned | PAC.param-name ] ; }
                    goal-location =  [ ARE.area-name | PAC.param-name ;
                    {PAC.touched-objects }
                    end { ; }
```

FIG. 27 SYNTAX OF A COMMUNICATE ACTIVITY (COM)

```
communicate-activity
        ::= communicate PAC.activity-name ( { PAC.param-decl
            [ , PAC.param-decl ]* } ) ;
            {display-text =    ID.literal-string ;}
            {priority =        [ ID.unsigned | PAC.param-name ] ; }
            {random =          [ ID.truth-value | PAC.param-name ] ; }
            {min-duration =    [ ID.unsigned | PAC.param-name ] ; }
            {max-duration =    [ ID.unsigned | PAC.param-name ] ; }
            {PAC.touched-objects }
            { type =    [ phone | fax | e-mail | face2face | pager | none |
                        PAC.param-name ] ; }
            with =      [ [ AGT.agent-name | OBJ.object-name |
                        PAC.param-name ] [ , [ AGT.agent-name |
                        OBJ.object-name | PAC.param-name ] ] ;
            transfer-definition [ , transfer-definition ]* ;
            {when = [ start | end ] ; }
            end { ; } transfer-definition       ::= transfer-action ( PRE.comparison )

transfer-action           ::= send | receive
```

FIG. 28 SYNTAX OF A BROADCAST ACTIVITY (BCT)

```
broadcast-activity ::=  broadcast PAC.activity-name
                        ( {PAC.param-decl [ , PAC.param-decl ]* }) ;
                        {display-text = ID.literal-string ; }
                        {priority =     [ ID.unsigned | PAC.param-name ] ; }
                        {random =       [ ID.truth-value | PAC.param-name ] ; }
                        {min-duration = [ ID.unsigned | PAC.param-name ] ; }
                        {max-duration = [ ID.unsigned | PAC.param-name ] ; }
                        {PAC.touched-objects }
                        COM.transfer-definition [ , COM.transfer-definition ]* ;
                        {when = [ start | end | PAC.param-name] ; }
                        end { ; }
```

FIG. 29 SYNTAX OF A PRECONDITION (PRE)

precondition ::= [ known | known-value | unknown ] ( comparison )

comparison ::= val-comp | rel-comp val-comp ::= expression BEL.evaluation-operator expression |
BEL.obj-attr BEL.equality-operator ID.literal-string |
BEL.obj-attr BEL.evaluation-operator BEL.object-ref |
BEL.object-ref BEL.evaluation-operator BEL.object-ref rel-comp ::= BEL.obj-attr REL.relation-name BEL.obj-attr
{ is ID.truth-value } | BEL.obj-attr REL.relation-name
BEL.object-ref { is ID.truth-value } | BEL.object-ref
REL.relation-name BEL.object-ref { is ID.truth-value } expression ::= term | expression [ ± | - ] term term ::= factor | term [ * | / | div | mod ] factor factor ::= primary | factor ^ primary primary ::= - primary | element element ::= ID.number | ( expression ) | BEL.obj-attr | VAR.variable-name

FIG. 30 SYNTAX OF A CONSEQUENCE (CON)

consequence ::= conclude ( ( PRE.comparison )
{ , fact-certainty }
{ , belief-certainty } )

fact-certainty ::= fc = ID.unsigned belief-certainty ::= bc = ID.unsigned

FIG. 31 SYNTAX OF A DETECTABLE (DET)

| | | |
|---|---|---|
| detectable | ::= | detectable-name : { when [ whenever | ID.unsigned ] }<br>detect (( PRE.comparison ) { , detect-certainty } )<br>{ then detectable-action };<br>end {; } |
| detectable-name | ::= | ID.name |
| detect-certainty | ::= | dc = ID.unsigned |
| detectable-action | ::= | continue | interrupt | abort | complete | end-activity |

FIG. 32 SYNTAX OF A VARIABLE (VAR)

| | | |
|---|---|---|
| variable | ::= | [ assigned | unassigned ]<br>[ collect-all | for-each | for-one ] ( ATT.type-def )<br>variable-name ; |
| variable-name | ::= | ID.name |

FIG. 33 SYNTAX OF AN AREA DEFINITION (ADF)

| | | |
|---|---|---|
| area-definition | ::= | area-def area-def-name:<br>{display-text = ID.literal-string ; }<br>{ GRP.attributes }<br>{ GRP.relations }<br>{ GRP.initial-facts }<br>end {; } |
| area-def-name | ::= | ID.name |

FIG. 34 SYNTAX OF AN AREA (ARE)

area ::= area area-name instance-of-area-def-name { part-of area-name } ;
    { display-text = ID.literal-string ; }
    { GRP.attributes }
    { GRP.relations }
    { GRP.initial-facts }
    end { ; } area-name ::= ID.name

FIG. 35 SYNTAX OF A PATH (PAT)

path-def ::= path path-name ;
    { display-text = ID.literal-string ; }
    area1 = ARE.area-name ;
    area2 = ARE.area-name ;
    { distance = ID.unsigned }
    end { ; } path-name ::= ID.name

SIMULATING WORK BEHAVIOR

CROSS REFERENCE TO RELATED APPLICATIONS

This application claims priority from co-pending, commonly-owned U.S. application Ser. No. 60/029,150 under 35 U.S.C. § 119 and a continuation of application Ser. No. 08/846,615 under 35 U.S.C. § 120. The disclosures of the priority applications are incorporated here by this reference in their entirety.

BACKGROUND OF THE INVENTION

The invention relates generally to simulation tools, and more particularly to tools for modeling human activities that may occur in a business, school, or other social setting.

Two types of models of work are now generally incorporated in business modeling tools: work flow models and business process models.

Work flow models describe a flow of information and representational materials (e.g., forms) through an organization. Work flow models generally represent the idealized procedures of standard policies and plans, rather than what people actually do.

Business process models describe organizations and functional transformations at a high level. Business process models are often framed in terms of role relationships of people, tasks, and information, such as customer-supplier, process-activity, or role-actor, or in terms of conversations for action (request-negotiate-perform-close). Business process models emphasize event-triggered interdependencies: for example, when an order arrives on a fax, a person in a given role processes the order.

SUMMARY OF THE INVENTION

The methods and apparatus of the invention are embodied in a simulation tool, which is a programmed computer system environment for creating, manipulating, running, and presenting models. The tool is called Brahms and its models are called Brahms models. The examples and discussion in this specification will use models of workplaces for purposes of illustration, and many of the advantages of the invention relate specifically to workplace simulation. However, the tool and its technologies are suitable for modeling other kinds of social situations.

The Brahms simulation engine is a computer program that interprets or runs models. A model may be written in a representation language or it may be built interactively by a model builder through a graphical user interface. A model may represent different types of objects (e.g., workers, customers, orders, physical resources, documents) and their instances. The simulation is distributed through the activities of the agents and the operation of physical artifacts such as telephones, information processing systems, faxes, and products of the workplace being simulated.

In general, in one aspect, the invention features a method of modeling behavior of a subject interacting with a world. The method includes storing in a computer memory a model having elements including an agent modeling the subject and having one or more beliefs and facts modeling objective observable aspects of the world. A belief is a unit of information held and used internally by the agent. The behavior of the subject is modeled by one or more frames for the agent to perform, each frame being a workframe modeling a time-consuming portion of the activity or a thought-frame modeling a non-time-consuming portion of the activity. Model elements also include a detectable modeling acquisition of information and response to information by the subject. The detectable is associated with a workframe and is operative during the whole, or a specified portion, of the time the associated workframe is active. (A workframe is considered active for an agent from the time the agent begins performing to the time the agent completes performing the workframe.) The detectable has a fact template: any facts matching the fact template are detected by the agent to form beliefs of the agent; an agent obtains information in this way while the associated workframe is active. The detectable also has a detectable type defining the effect of an agent belief satisfying the detectable (matching the detectable fact template) during the time the detectable is operative.

Preferred embodiments of the invention include one or more of the following features. Conditions to be satisfied before the agent may begin performing a frame are defined as preconditions of the frame. Each workframe has a priority for comparison with priorities of other workframes. Running the model on the computer over a period of simulated time includes selecting for each of the times in the period one of the frames to be the working frame; maintaining a context of active workframes (those workframes that have started but not completed or terminated working), the context representing what the subject is doing at any time in the simulation; and performing the working workframe until the working workframe completes or another workframe is selected to be performed in place of the working workframe. Another workframe is selected when a detectable effect causes an impasse in the working workframe, a detectable effect completes or aborts the working workframe, or a higher-priority workframe interrupts the working workframe.

The model elements include a detectable having a type causing performance of an associated workframe to be interrupted by an impasse until beliefs of the agent change. The model elements include a detectable having a type causing performance of an associated workframe to be aborted and a type causing performance of the workframe to be completed by going directly to perform any consequences of the workframe. A first detectable associated with a first workframe is operative the entire time the first workframe is active, and a second detectable associated with a second workframe is operative a specified portion of the time the second workframe is active. The model elements include a consequence associated with a frame, the consequence modeling changes in facts of the model or beliefs of the agent resulting from the behavior of the associated frame, and running the model includes executing consequences of frames to change facts of the model or beliefs of the agent. The model elements include a primitive activity (an atomic activity-modeling construct that is not decomposed into other activities and has a time duration), a composite activity (an activity-modeling construct defined by one or more workframes), and a workframe, the time-consuming behavior of which is defined by one or more primitive activities and one or more composite activities. A primitive activity has a time duration defined as a specific quantity or a random quantity and a priority used to calculate the priority of any workframe that includes the primitive activity. A primitive activity has a touched object (a reference to an artifact object of the model), and having a touched object models that an artifact is touched in the course of performing the primitive activity. The touched object is associated with the primitive activity and may be used for statistical purposes and generating object flows.

The model elements include a workframe having an activity of communicating a belief from one agent to another agent; a workframe having an activity of communicating a belief by broadcasting the belief; a workframe having preconditions and a do-once attribute set true, the workframe being performed only once for an agent for each distinct binding satisfying the workframe's preconditions; a detectable associated with a composite activity and having a type causing performance of the composite activity to be terminated when the detectable is satisfied; a geography defining locations in the modeled world and relationships between locations; a fact of a location of the agent in the geography, as to which the agent has a correct belief; and a workframe performing a primitive move activity having a goal location defined in the geography causing an agent to move to the goal location if the agent is not already there. The model is run by executing a simulation engine implementing semantics for primitive activities including primitive activities to communicate a belief and to create an artifact object.

The model elements include groups representing functions performed by agents that are members of the groups. Groups have group elements that may include initial beliefs associated with the group's functions, frames modeling behavior common to the function, and membership in other groups from which initial beliefs, frames, or group membership are inherited. An agent member of a group inherits initial beliefs and frames from the group and all other groups of which the group is a member. A behavior of the agent is modeled by a group of which the agent is a member. The model elements include a group modeling the habits of an agent with workframes having activities performed at regular times of day and days of the week, and a group modeling the expertise of an agent with workframes having activities modeling behavior requiring expertise.

The model elements include a general model of an activity. The general model has a first set of workframes with priorities in a high range and a second set of workframes with priorities in a middle range. The high range workframes model responses to impasse situations and the middle range workframes perform generic work of the general model. The general model may be invoked by a workframe having a priority lower than the middle range. The model elements include facts including a time of day, a day of the week, and a day of the year; and beliefs of the agent include a correct belief about the time of day. The agent has observable properties that are facts of the model. Beliefs of an agent are part of an internal state of the agent and are represented as propositions asserted by the agent, and preconditions of frames performed by an agent test only the beliefs of the agent. The agent is a model of a subject that is an interactive system selected from the group consisting of a person, a robot, an animal, or a computer-implemented process.

The model elements include an artifact object modeling a real thing in the world; an internal state for an artifact object, the internal state including one or more beliefs, and a factframe modeling behavior of the thing, the factframe having a precondition defining facts that must exist in the model before the artifact object may begin performing the factframe.

The model elements include a thoughtframe modeling information processing performed by an artifact object. The thoughtframe has preconditions to be satisfied before the thoughtframe may be performed. The model elements include a consequence operating to assert a belief to model a deduction occurring when the preconditions of the thoughtframe are satisfied; a detectable associated with a factframe and testing facts to have an effect that interrupts or aborts the behavior of the detectable's associated factframe; and a consequence associated with a factframe and operating to assert a fact or a belief to model results of behaviors in the consequence's associated factframe.

The model elements include a frame having a primitive activity of communicating a belief between an agent and an artifact object, and a frame having a primitive activity of communicating a belief between a first artifact object and a second artifact object. The model elements include conceptual objects representing intangible concepts, with an is-a-conceptual-object-of relation linking a conceptual object and an artifact object. Running the model includes performing a create-object activity to create a new artifact object by copying an existing artifact object and having the new artifact object inherit the is-a-conceptual-object-of relations of the existing artifact object, and generating concept statistics by tracking artifact objects linked by is-a-conceptual-object-of relations to conceptual objects. Running the model includes calculating a touch time of a conceptual object by calculating and summing the touch times of all artifact objects having an is-a-conceptual-object-of relation with the conceptual object. Running the model includes calculating a duration time of a conceptual object. Duration time is the total time over which activities occur that touch artifact objects having an is-a-conceptual-object-of relation with the conceptual object.

Running the model includes displaying to a user through a computer interface a view of work flow in the running model in which activities of individual agents relating to a conceptual object are chained together to show the processing of work. Running the model includes displaying views of the running model selected from a view of social relations among agents defined by relations defined in the model; a view of social relations among agents that emerge from social activities of agents involving other agents; a view of locations of agents or artifact objects over simulated time in the geography; a view of beliefs of agents over time; a view of communications between or among agents or artifact objects; a view of resource use showing use of resources including artifact objects and locations; a view of information processing by artifact objects performing thoughtframes or factframes; and a view of reasoning by agents performing thoughtframes or workframes.

In general, in another aspect, the invention features a method of simulating the behavior of an interactive system in a world. The method includes storing in computer memory a model having model elements including an agent modeling the interactive system, a fact representing a physical state of the world or an observable attribute of an agent, workframes modeling behaviors of the agent, and detectables. The agent has a state and a workframe has preconditions defining conditions to be satisfied by a state of the model or the state of the agent before the agent may begin performing the behavior of the workframe. Running the model on the computer includes assigning an initial state to each workframe from a set of states including notavailable; selecting the behavior performed by the agent by selecting a workframe from among the workframes having states available, working, or interrupted and from among those workframes a workframe having a highest priority; changing workframe states by changing a state from notavailable to available whenever all preconditions of the workframe are satisfied, changing a state from available to working whenever the workframe is selected to be the working workframe, changing a state from interrupted-with-impasse to interrupted whenever the detectable condition causing the impasse has ceased to be true, and changing a state from working to interrupted whenever a different, higher-priority available workframe is selected to be the behavior performed by the agent; and simulating the behavior defined in a selected workframe until one of the following occurs: the workframe has run to completion, at which occurrence the workframe state is changed to done and the workframe ceases to be active; a detectable effect interrupts the workframe because of an impasse, at which occurrence the workframe state is changed to interrupted-with-impasse; a detectable effect completes or aborts the workframe, at which occurrence the workframe ceases to be active; or a higher-priority workframe is in an state of available or interrupted.

In general, in another aspect, the invention features a method of providing services of an intelligent agent to a user. The method includes storing a world model on a computer system to maintain a record of facts about the real world, including information about actions of the user, and storing an agent model modeling the user. The agent model has a general component (a model of an idealized agent having the role or tasks of the user) and a situation-specific component (a description of the state and the beliefs of the user). The agent model is run on a computer under the control of a comparator process both in a forward-looking mode to generate predictions and in an explanatory mode to compare predictions generated by the agent model with actions of the user. The general component of the agent model stands in place of an expert system as a source of predictions for the comparator process. Running the model includes receiving information about the real world including about actions of the user and adding the information to the world model during the running of the agent model; transmitting differences, issues, or problems identified by the comparator process to an advisor process running on a computer; and running the advisor process to formulate differences, issues, or problems received from the comparator process and to provide them in the form of assistance or teaching to the user.

Preferred embodiments of the invention include one or more of the following features. The user is an interactive system selected from a person, a robot, an animal, or a computer-implemented process. The general component of the agent model includes workframes representing the role or tasks of the user as behaviors that in the aggregate define the idealized behavior of an agent representing the user in the agent model. Running the agent model includes observing changes in the world model while the agent model is executing to identify changes by reason of which preconditions or detectables are satisfied. The comparator process applies explanation-based learning to modify the general component of the agent model to represent variations in practice. The information stored in the world model is obtained electronically from a database linked to the computer system. The computer system includes a comparator computer operating to run the comparator process and a model computer operating to run the agent model. The user may be a person and the computer system may includes a personal digital assistant coupled to the comparator computer for information transfer by a wireless link, the personal digital assistant operating to communicate information between the user and the intelligent agent.

Among the advantages realized by embodiments of the invention are one or more of the following. A Brahms model can separately represent the technology (parts and materials, with their structural and causal relations), the setting (geographic layout of offices), the people (organizations, groups, agents) and the activities of a workplace. The environment (e.g., customers and competitors and their geographic layout) can be viewed explicitly as interacting with and influencing the workplace being simulated.

Brahms applies cognitive modeling techniques to social processes. Constructs of the representational language and engine are based on techniques used in multi-agent knowledge-based simulations. However, the constructs are interpreted in a Brahms model in a way that is different from the interpretation of symbolic cognitive models. The important differences from cognitive modeling include the following. In a Brahms model, composed action sequences are viewed as activities, not merely tasks or procedures, so they are a socially-organized conception of how interactions normally occur between or among people and things in the world. In a Brahms model, an agent's goals (intentions) are represented as the activities the agent is currently performing—a set of interactive behaviors in particular settings—not merely static names for desired end states. Similarly, situation-action rules (workframes) are conceived in Brahms as observer descriptions of patterns of an agent's behavior, not things literally stored in the head of the person being modeled. And finally, preconditions and post-conditions of workframes are either observable states of the world or conscious claims an agent makes, and not arbitrary, objective descriptions (that is, not views from nowhere).

Brahms can model the reactive nature of human behavior. Brahms allows modeling how people dynamically shift their attention, interrupt and resume activities, and compose activities in which they have multiple interests at once.

Brahms models can represent the activities of work at a level of description that cognitive and business process models generally omit. Brahms facilitates the building of models that describe informal and actual practice. Brahms is useful for building models representing events that workers experience as problematic, especially situations that require interactions with other people.

Brahms models can be used to show how a social-technological system actually behaves and how it changes its capacity over time through emergent relations between people and their environment. Brahms models can embody multiple perspectives for describing and understanding interactions between people and events. These perspectives include individual events (what people do and what happens in the environment at particular moments), as distinguished from work practice abstractions (statistical patterns observed in the system); individuals' beliefs about the world, as distinguished from the world model; and activities modeled in terms of individual agents, as distinguished from activities modeled in terms of group inputs and outputs.

A Brahms simulation can represent an individual's working on more than one task at a time. A Brahms model can represent the skills an individual needs to perform a task. A Brahms model can represent the cooperation required to perform a task, represent individual or group differences concerning coordination and scheduling, and represent people working together. A Brahms model can explicitly represent how work tasks are split geographically and can show the use of multiple physical resources on one task. A Brahms model can show how a queue of tasks is processed, with interruptions and individuals' decision making in selecting what to do next. By running a Brahms model, a user can generate product and resource flow information dynamically—for example, to show how orders move through an organization by virtue of exceptions, informal assistance, and knowledge of other people's expertise. Brahms can provide multi-agent simulations, focusing on who talks to whom, when, where, and how. A Brahms simulations can show movement of people, materials, and information in the physical space where interactions occur. Brahms can model both cognitive and social aspects of work. Brahms models can be integrated into an overall work systems design process.

Brahms provides representations that make social processes visible. In watching a Brahms simulation, one can see specific events and interactions and can imputes broader social processes to emergent interactions. Thus, Brahms models can be used to present and evaluate theories about how people, organizations, and technology interact.

Other features and advantages of the invention will become apparent from the following description and from the claims.

BRIEF DESCRIPTION OF THE DRAWINGS

FIGS. 9–35 show elements of a Brahms model in a formal syntax of a Brahms modeling language expressed in a modified Extended Backus Naur Form.

FIG. 9 shows the elements of the syntax notation and of identifiers.

FIG. 10 shows the elements of a model in the Brahms modeling language.

FIG. 11 shows the elements of an agent in the Brahms modeling language.

FIG. 12 shows the elements of a group in the Brahms modeling language.

FIG. 15 shows the elements of a conceptual object class in the Brahms modeling language.

FIG. 16 shows the elements of a conceptual object in the Brahms modeling language.

FIG. 13 shows the elements of an object class in the Brahms modeling language.

FIG. 14 shows the elements of an object in the Brahms modeling language.

FIG. 17 shows the elements of an attribute in the Brahms modeling language.

FIG. 18 shows the elements of a relation in the Brahms modeling language.

FIG. 19 shows the elements of an initial-belief in the Brahms modeling language.

FIG. 20 shows the elements of an initial-fact in the Brahms modeling language.

FIG. 21 shows the elements of a workframe in the Brahms modeling language.

FIG. 22 shows the elements of a thoughtframe in the Brahms modeling language.

FIG. 23 shows the elements of a composite activity in the Brahms modeling language.

FIG. 24 shows the elements of a primitive activity in the Brahms modeling language.

FIG. 25 shows the elements of a create object activity in the Brahms modeling language.

FIG. 26 shows the elements of a move activity in the Brahms modeling language.

FIG. 27 shows the elements of a communicate activity in the Brahms modeling language.

FIG. 28 shows the elements of a broadcast activity in the Brahms modeling language.

FIG. 29 shows the elements of a precondition in the Brahms modeling language.

FIG. 30 shows the elements of a consequence in the Brahms modeling language.

FIG. 31 shows the elements of a detectable in the Brahms modeling language.

FIG. 32 shows the elements of a variable in the Brahms modeling language.

FIG. 33 shows the elements of an area definition in the Brahms modeling language.

FIG. 34 shows the elements of an area in the Brahms modeling language.

FIG. 35 shows the elements of a path in the Brahms modeling language.

DETAILED DESCRIPTION

Elements of Simulation Tool and Modeling Constructs

Figure 1:
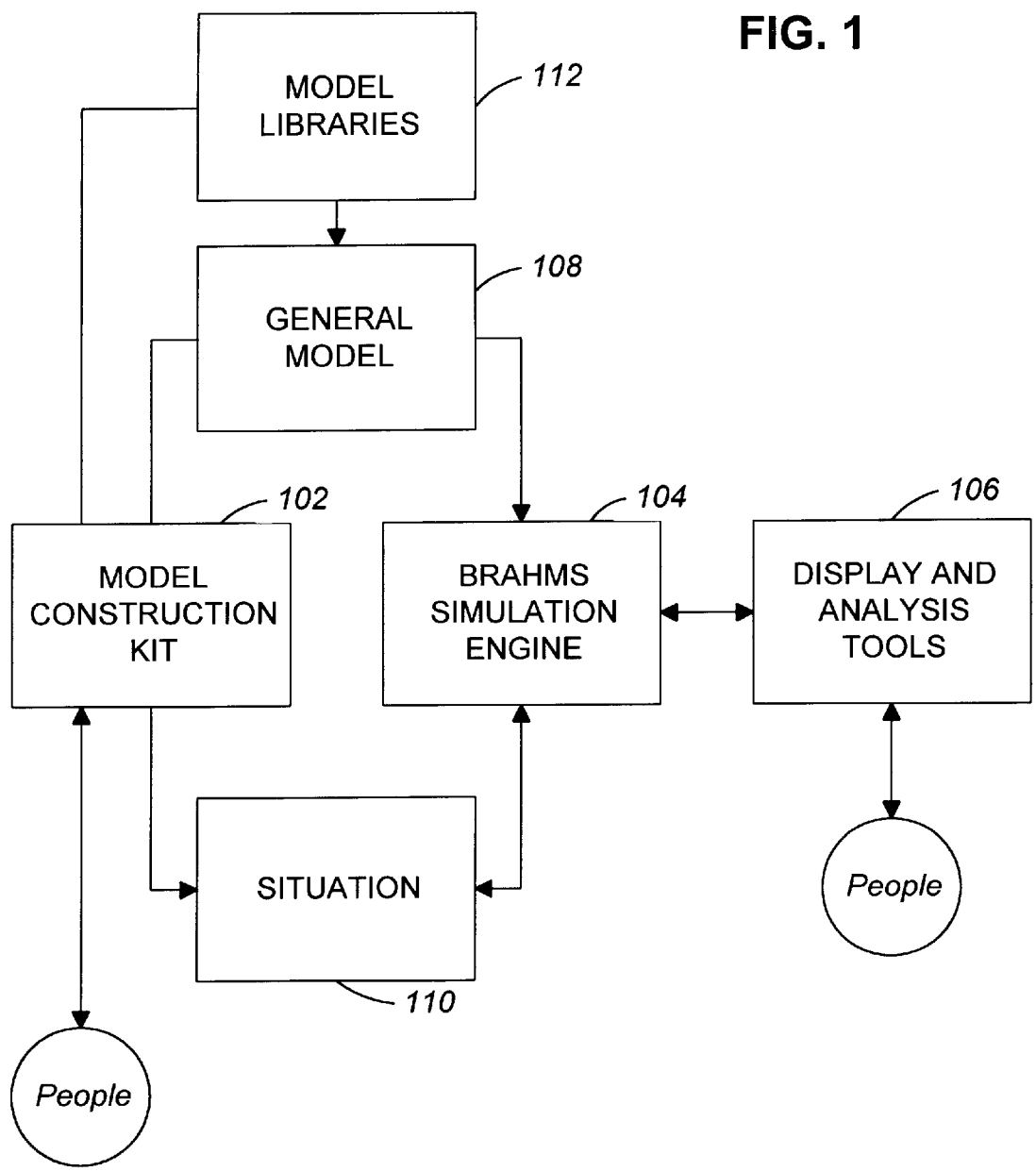
FIG. 1 is a overview block diagram of the Brahms simulation tool in context.

Referring to FIG. 1, a simulation tool (Brahms) for simulating working behavior includes a number of computer program modules: a kit for constructing and editing models 102, a simulation engine 104 for interpreting general models 108 in the context of situation-specific events 110, and display and analysis tools 106 for presenting and experimenting with models. The models and modules are stored in computer memory (not shown), such as processor-addressable random access memory while a simulation of the model is running and disk memory for longer-term storage. Brahms has been implemented as a knowledge base within a knowledge-based modeling system called G2, which is available from GenSym of Cambridge, Mass.

People and artifacts (both physical and conceptual) are represented as "objects", generally having properties, such as geographical location, that may change over time, depending on their interactions. The term "agent" is generally used to refer specifically to an object that represents a person or, more inclusively, that represents an interactive system that has behavior interacting with the world. The environment may also be modeled as having properties that change over time, which may depend on interactions between the modeled people and artifacts.

Referring to FIGS. 9–35, Brahms models may be thought of or expressed as statements in a new formal language developed for describing work practice. FIG. 9 shows the conventional notation and constructs used to express the syntax for the modeling language. Like Brahms, the language is domain-general, in the sense that it refers to no specific kind of social situation, workplace, or work practice; however, it does embody assumptions about how to describe social situations, workplaces and work practice.

Referring to FIG. 10, the constructs used to build a Brahms model include groups, agents, object classes, and objects.

Referring to FIG. 11, an agent is a construct that generally represents a person within a workplace or other setting being modeled. Agents have a name and a location. To specify what an agent does, the model builder defines workframes for the agent. The key properties of agents are group membership, beliefs, workframes, thoughtframes, and location.

Referring to FIG. 14, an object is a construct that generally represents an artifact. (This construct may also be referred to as an object-instance, an artifact object, or simply as an artifact when it is clear a modeling construct is meant.) The key properties of objects are facts and factframes, and activities, which together represent the state and causal behaviors of objects. Some objects may have internal states, such as information in a computer, that are modeled as beliefs. Other artifact states—such as the fact that a phone is off hook—are facts about the world. Thus, an agent can record in an object beliefs for others to read; for example, an agent can be modeled as recording messages for others in a voicemail object.

Referring to FIG. 12, a group can represent one or more agents, either as direct members or as members of subgroups. Typically a model builder would associate descriptions of activities with groups, so that a group generally represents a collection of agents that perform similar work and have similar beliefs. A group may have only one member and roles may be highly differentiated. Depending on the purpose of the model, agents in a model may represent particular people, types of people, or pastiches. The model builder may define groups to represent anything, such as "service technicians", "people who like sushi", or "people who wear suits". Each agent and group can be a member of any number of groups, providing that no cycle of membership results.

Similarly, referring to FIG. 13, an object class can represent one or more object instances.

The model builder can specify initial-beliefs (FIG. 19), initial-facts (FIG. 20), workframes (FIG. 21), and thoughtframes (FIG. 22) for a group or an agent. When an agent is a member of a group, the agent inherits the group's initial-beliefs, initial-facts, workframes, and thoughtframes.

Referring to FIG. 21, a workframe defines an activity that an agent or object may perform, as well as the preconditions and consequences to carrying out the activity. When performed by an object, a workframe may be referred to as a factframe.

Referring to FIG. 29, a workframe precondition tests a belief held by the agent executing the workframe. A workframe detectable describes circumstances an agent might observe while executing the workframe that could create an impasse to completing the activity. These circumstances should be in the form of immediate, perceivable information or materials, or of beliefs that can be held by the agent.

The relationship among these constructs is summarized in table 1 below.

TABLE 1

GROUPS are composed of
  AGENTS having
    BELIEFS and doing
    ACTIVITIES defined by TABLE 1-continued WORKFRAMES (conditional activities) defined by
  PRECONDITIONS
  PRIMITIVE ACTIVITIES
  DETECTABLES, including IMPASSES
  SIDE-EFFECTS IN PROPERTIES OF ARTIFACTS
  SUBACTIVITIES Facts and Beliefs The state of the world in Brahms is stored in informational units called "facts" and "beliefs". A fact is meant to represent some physical state of the world or an attribute of some object or agent. Facts are global: with the appropriate workframe, any agent can detect a fact.

A belief is the knowledge of some fact by a particular object, typically an agent. Beliefs are always local to an agent or object; that is, only the agent or object itself can examine or search (i.e., reason with) its own beliefs, and no other agent or object can do so. The current value of a belief held by an agent may differ from the value of the corresponding fact.

Referring to FIG. 17, an attribute represents a property of a group, agent, object class or object and is defined within a group, agent, class or object definition. Attributes have values. The value of an attribute is defined through facts and/or beliefs. Attributes can have different scopes within the specified concepts defined by one of the keywords private, protected or public. Private attributes are not inherited by subgroups or subclasses. Protected attributes are inherited by subgroups and subclasses. Public attributes can be referenced by initial beliefs, initial facts, workframes and thoughtframes in any group, agent, class or object. The default scope of an attribute is public.

Referring to FIG. 18, a relation represents a relationship between two objects. The first (left hand side) object is the object for which the relation is defined; the second object (right hand side) can be any object. Relations are defined within a group, agent, conceptual object class, conceptual object, object class or object definition. Relations can have different scopes defined by one of the keywords private, protected or public, which keywords are defined as for attributes.

Referring to FIG. 19, beliefs can be declared as initial beliefs at the object class, object, group, or agent level, or beliefs can be created by a running Brahms model. A belief can be thought of as an (object, attribute, value) triple.

Referring to FIG. 20, facts can be created by the model builder as initial facts at the object class, object, group, or agent level, or created by the simulation engine during simulation. Facts have the same components as beliefs.

The representation of beliefs and reasoning implements a conventional first-order predicate logic on beliefs. The model builder has available the full range of representation of, and reasoning on, beliefs conventionally found in rule-based systems such as EMYCIN. However, because the logic is first-order, agents are not modeled as having beliefs about other agents' beliefs.

Factframes and Thoughtframes (Frames)

In addition to workframes, there are closely related constructs called factframes and thoughtframes, all of which are collectively referred to as frames. The term "factframe" is used to refer to a workframe (see FIG. 21) that is performed by a (non-agent) object rather than an agent. Factframes satisfy their preconditions with facts rather than with beliefs. In an implementation, factframes may be limited to contain only primitive activities, not complex composite activities. Factframes are inherited from object classes as workframes are inherited from groups. Factframe consequences produce facts rather than beliefs.

Referring to FIG. 22, thoughtframes define deductions. Thoughtframes are similar to workframes, but are taken to be inferences an agent (or object) makes without executing any activities. Thoughtframes have the same preconditions as workframes. Thoughtframes have no activities, consume no time, and cannot be interrupted. Once the preconditions of a thoughtframe match, its consequences are automatically executed. Thoughtframes have no communications.

Preconditions

Referring to FIG. 29, a precondition is a comparison that guards a frame. All preconditions must evaluate to true before the frame will become available to be worked on by an agent or object. Factframe preconditions are satisfied when facts match, whether or not any agent believes those facts.

Precondition tests can be of types known, unknown, and known-value. When the type is "unknown", for the precondition to evaluate to true, the agent must have no belief of the information being checked. In a factframe, there must be no fact of the information being checked. Thus, Brahms has three truth-values: true, false, and unknown. If a particular fact-value or belief-value is not present, then it is said to be unknown rather than being false. This allows agents to have preconditions of the form "If I do not know the due-date of order-3 then . . . ".

When the precondition test type is "known", for the precondition to evaluate to true for workframe or thoughtframe, the agent must have a belief about the information with any value for that belief. "The agent knows the customer's name" is an example. For a factframe, a fact about the information with any value must exist.

When the precondition test type is "known-value", the behavior is similar to that of "known" except that a relational test is performed to a fixed value located in the precondition. "The agent knows the customer's name, and the customer's name is not Citibank" is an example.

Workframe Activities

Referring to FIGS. 23 and 24, the activities of a workframe are one or more primitive activities, one or more composite activities or both. A composite activity includes one or more workframes, any of which may trigger other composite activities, each with its own workframes. Other than a few predefined atomic activities that have semantics, activities are differentiated solely by the model builder's description and use of them.

Referring to FIG. 24, primitive activities take time, which may be specified by the model builder as a definite quantity or a random quantity within a range. However, because workframes can be interrupted and never resumed, when an activity will finish cannot be predicted from its starting time. Primitive activities are atomic behaviors and are not decomposed. Whether something is modeled as a primitive activity is a decision made by the builder of any particular model.

A primitive activity has a priority that is used for determining the priority of workframes.

A primitive activity may be defined as having touched objects. This allows artifacts to be associated with activities for statistical purposes and for the purpose of generating object flows. Artifacts that are defined as resources only collect statistics and are not used for object flow generation. Artifacts that are defined not to be resources and that are touched objects of an activity are called touch objects. Touch objects should be associated with one or more conceptual objects for object flow purposes and statistical purposes.

In a Brahms simulation, an agent may be doing multiple activities at any given time, but only one workframe is active at any one time. At each clock tick, the simulation engine determines which workframe should be selected, based on the priorities of available, current and interrupted work. Current work is selected in preference to interrupted or available work of equal priority, so that an agent tends to continue doing what it was doing. The selected workframe is then executed, leading to the agent to detect things in the world and possibly begin a subactivity. When a workframe is interrupted, it is reexamined on subsequent clock ticks to see whether it should be considered for selection. When a composite activity is terminated because its end condition is satisfied, the workframes below it are also terminated. When an activity is interrupted, Brahms saves the line of activities and workframes so context can be reestablished after an interruption. An important consequence and benefit of this programming paradigm is that all of the workframes of a model are simultaneously competing and active, and the selection of a workframe to execute is made without reference to the stack or tree of workframe execution history.

Figure 2A:
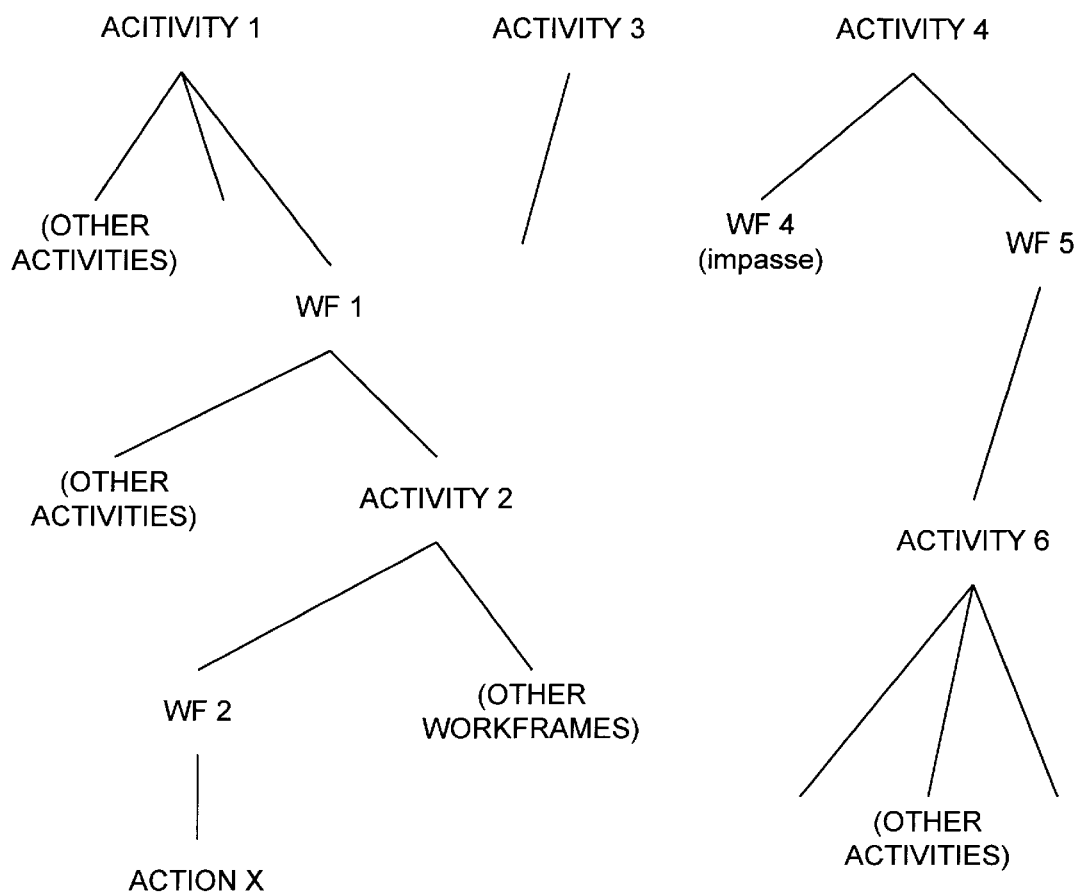
FIG. 2A is a schematic diagram illustrating the state of an illustrative Brahms simulation.

This is illustrated in FIG. 2A. An agent (not shown) in a running model may have multiple competing general activities in process: Activities 1, 3, and 4. Activity 1 has led the agent (through workframe WF1) to begin a subactivity, Activity 2, which has led (through workframe WF2) to a primitive activity Action X. When Activity 2 is complete, WF1 will lead the agent to do other activities. Meanwhile, other workframes are competing for attention in Activity 1. Activity 2 similarly has a competing workframes. Priority or preference rankings led this agent to follow the path to Action X, but interruptions or reevaluations may occur at any time. Activity 3 has a workframe that is potentially active, but the agent is not doing anything with respect to this activity at this time. The agent is doing Activity 4, but reached an impasse in workframe WF4 and has begun an alternative approach (or step) in this Activity WF5. This produced a subactivity, Activity 6, which has several potentially active workframes, all having less priority at this time than WF2.

Activities may have preferential start times, as expressed in preconditions, which may refer to the time in hours, minutes, seconds, day of the year, and/or day of the week. Agents and objects always have beliefs about the current time. Brahms recognizes a variety of temporal constraints, such as "always after" a particular time, "always before leaving", and "usually in the morning". Thus, an activity may be interrupted by a scheduled activity, such as going to lunch at noon. Time may change the priorities of behaviors and the same activities might be done at different times by different people.

Differences between individuals can be represented by representing two or more agents with different workframes who have the same role within an activity. Individual differences can also be modeled by giving the agents the same workframes but different beliefs about the world.

A workframe is a larger unit than the simple preconditionactivity-consequence design might suggest, because a workframe may model relationships involving location, object resources such as tools and documents, required information, other agents the agent is working with, and the state of previous or ongoing work. Active workframes may establish a context of activities for the agent and thereby model the agent's intentions, e.g., calling person X to give or get information, or going to the fax machine to look for document Y. In this way, behavior may be modeled as continuous across time, and not merely reactive.

Composite Activities

Referring to FIG. 23, a composite activity expresses an activity that in its turn may require several workframes to accomplish. Since composite activities are declared within the then part of a workframe, each is performed at a certain time within that workframe. Preference or relative priority of workframes can thus be modeled by grouping them into ordered composite activities. The workframes within an composite activity, however, can be performed in any order, depending on when their preconditions are satisfied. In this fashion, workframes can explicitly control executions of composite activities, whereas execution of workframes depends not on their order but on the satisfiability of their preconditions and the priorities of their activities.

Composite activity can terminate in the following four ways. First, a composite activity terminates whenever the workframe in which it is declared terminates due to a detectable of type complete or abort; second, a composite activity terminates whenever a detectable of type complete or abort is detected within the composite activity; third, a composite activity terminates immediately whenever an end condition declared within the composite activity is activated; and fourth, a composite activity terminates when the model builder has defined it to be ended "when there is no more work available" and no more workframes in the composite activity are available or being worked on. During the execution of a composite activity, the engine continuously checks whether the agent has received a belief that matches any endconditions.

Workframe Instantiations

How often a workframe is activated for an agent is defined by the model builder. Since a workframe can be made available to a number of agents simultaneously and multiple times to each agent, it is not the workframe itself but rather a specific, agent-dependent, time-dependent, instance of a workframe that is activated. This is called a workframe instantiation, or "wfi" for short.

Figure 2B:
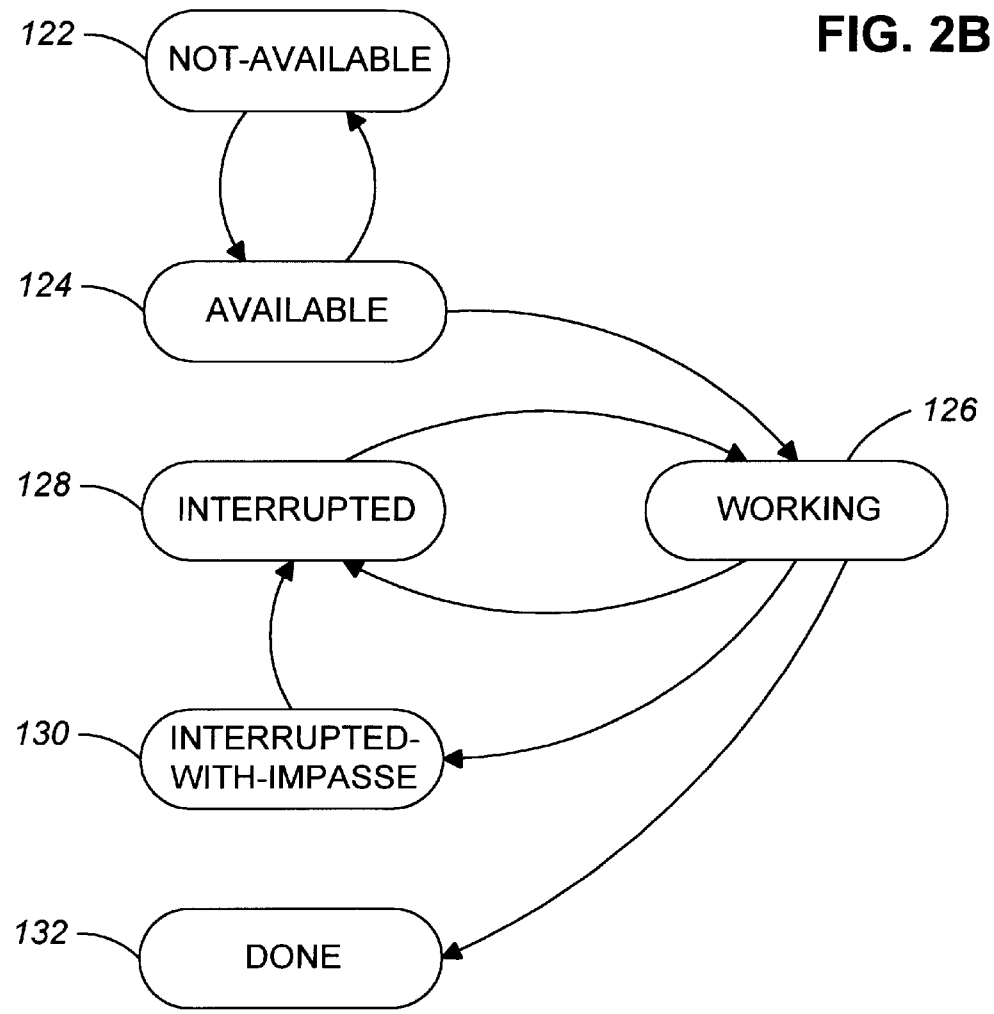
FIG. 2B is a state transition diagram for workframe states.

Referring to FIG. 2B, workframes (and their instantiations) can be in one of several states for an agent during a simulation. These are: not-available 122, when the agent's current beliefs do not allow a workframe instantiation to be worked on; available 124, when the agent's beliefs allow the workframe to be worked upon, but a wfi has not been started; working 126, when the wfi is currently the one being worked on; interrupted 128, when the wfi has started but is currently interrupted; interrupted-with-impasse 130; and done 132.

When a workframe has its repeat property set to false (FIG. 21), the engine will execute the workframe only once for any one specific binding combination. With the simplified workframe and agent shown in the following table 2, exactly two workframe instantiations will be created, one for each matching belief.

TABLE 2

```
Workframe:
    repeat = false;
    variables: for-each (Car) the_car;
    when ((The car of John equals the_car))
    do admire-car (300);
Agent:
    initial-beliefs:
        (The car of John has-value car-1);
        (The car of John has-value car-2);
```

If the belief changes from car-1 to car-3, the workframe will be instantiated again. If the belief later changes back from car-3 to car-1, the workframe will not be instantiated again.

In contrast, when the workframe has its repeat property set to true, the workframe is available to be executed whenever its preconditions match.

Detectables

Referring to FIG. 31, a detectable is a mechanism by which, whenever a particular fact occurs in the world, an agent or object may notice it. The noticing of the fact may cause the agent or object to stop or to finish the work of the workframe.

Two things can occur in a detectable. First, the agent or object detects the fact and the fact becomes a belief of the agent or object. Second, in the case of an agent, the beliefs of the agent are matched with the form used in the detectable and if there is a match, the then part of the detectable is executed, which may abort or interrupt the workframe. For objects, in the second step the facts in the world are matched with the detectable definition and if there is a match, the then part is executed. These two steps are independent: whether or not the fact is present in the world, the second step is performed. For example, if "the color of the telephone-1 is blue" is a fact and a workframe contains the following detectable condition "the color of the telephone-1 is red", an agent will obtain the belief "the color of telephone-1 is blue". In the second step, "red" would be compared with "blue" and fail, so the then part of the detectable would not be executed.

The action or then part of a detectable defines the detectable type and is one of five keywords: continue, abort, complete, impasse, and end-activity. Continue is the default: the agent detects conditions, but the workframe proceeds unaffected. With abort, a condition causes the agent to stop executing the workframe. With complete, a condition allows the agent to reach the consequences of the workframe without doing the rest of the workframe's activities. With impasse, the condition prevents the continuation of the workframe until the condition is removed. The workframe goes into interrupted-with-impasse state. End-activity is only meaningful when the detectable is in a composite activity: it does not detect facts and causes the activity to be terminated immediately.

The principal attributes of a detectable are shown in table 3 below.

TABLE 3

| When detected | This can be a percentage of the workframe working time before the condition is detected. For example, a "0%" means that the condition is detected at the very beginning of the workframe. A "75%" on a 20-minute |
|---|---|

TABLE 3-continued

| | |
|---|---|
| | workframe means that the condition is detected only after working on the workframe for 15 minutes. This attribute can also be "whenever". All "whenever" detectables are checked when the workframe first starts, whenever a new fact is created, and when the agent has received or created a new belief. |
| Detection probability | The detection certainty, i.e., the probability that the agent will detect the condition if it is present. |
| Object and attribute reference, test-type, and a test-value | These define the condition and the test of the belief created after detection. |
| Impasse-type | The execution of a workframe can be affected by detecting certain conditions, according to the type of the impasse. |

It is worth emphasizing that the detectable mechanism is operative for all workframes on the execution path of the agent's working frame, even frames that are in an interrupted or impasse state, so that a "whenever" detectable in any of those frames can detect a fact at any time.

Detectables can be used to model impasses. A common example of an impasse is inaccurate or missing information. Workframes may be written to handle impasses. For example, if a supervisor is ready for a technician but does not know the technician's name, another workframe may lead the supervisor to look up the name. Impasses may also be handled by modeling social knowledge. For example, the initial-beliefs of an agent may be modeled to include beliefs that various people know certain things.

With a detectable, an agent may notice passive observables, as when someone shouts, a fax machine beeps, or an agent is present vying for attention. Passive observables fall into two general classes: sounds and visual states. Objects that cause a sound—fax, phone, initial bid by a person for conversation—create the fact of the sound, which fact can be detected. Sounds may persist over many ticks. Propagation into the surrounding space will recur as long as the object is making a sound. Propagation may be affected by geography.

In an alternative embodiment, the reach of the senses of an agent is limited by "auras" associated as attributes of the agent or of a group of which the agent is a member. An aura is a refinement of the concept of co-location and defines a (not necessarily symmetric) distance limit for objects that can be seen and sounds that can be heard, even when the geography model considers the source and the agent to be in the same location. An agent's aura of perception for a sense can be defined for subsets of the range of loudness, for example, for sound; and of size, for example, for sight. The extent of an aura can also be defined to depend on other attributes of the source, so that a bid for attention, such as a flashing light, may be modeled to be seen at a greater distance than a plain parcel.

Workframe Consequences

Referring to FIG. 30, consequences are facts or beliefs or both that may be asserted when a frame is performed. They exist so a model builder may model the results of the activities in a workframe, such as the current agent having a belief of new facts. A consequence is formally like a condition (FIG. 29) and defines the facts or beliefs that will be created or changed. The property "fact-certainty" is the probability that the fact will be changed or created; the default value is 100%. The property "belief-certainty" is the probability (with a default value of 100%) that the belief will be changed or created, conditional on the fact being true. That is, if the fact-certainty and the belief-certainty are each 50%, then 1 in 2 times the fact will be created and 1 in 4 times the belief will be created. If the fact-certainty is zero, then no fact will be created but the belief-certainty determines how often a belief is created.

Built-In Primitive Activities With Semantics

As has been mentioned, referring to FIG. 24, primitive activities are atomic behaviors, and a small number of primitive activities are defined to have a semantics that is implemented by the Brahms engine. These predefined primitive activities exist to communicate beliefs and facts, create objects, and travel to a location. In the activities that communicate or create, the model builder may specify that the communication or creation occurs (i.e., is effective) at the beginning or at the end of the duration of the primitive activity.

Primitive Create-Object Activities

Referring to FIG. 25, primitive create-object activities allow the model builder to create new objects or to make copies of objects dynamically. The model builder can specify when the actual creation or copying takes place by setting the when value to either start or end. Create-object activities can be used, for example, to model a fax machine creating a new instance of a fax elsewhere, or a customer creating an order (modeled as a conceptual object). In addition, in a create-object activity, an object can automatically be connected to a conceptual object or placed at a location.

Primitive Move Activities

Referring to FIG. 26, primitive move activities trigger an agent or object to move to a location if not yet located there. For this activity, the model builder defines the goal, such as the name of a building in the geography model, or a variable referring to the name of a building.

In moving, an agent or object may act as a container for another agent or object that is carried along with the moving one. A car may carry an agent, for example, and then move to a new location. To effect this, the model builder links the carrier and the carried with the built-in relation is-carrying before the move activity is executed, typically with a consequence that asserts the relation, and then negates the relation with another consequence when the trip is completed.

When a primitive move activity is encountered and the goal is different from the agent's or object's current location, the agent or object will start moving to the goal location. The simulation engine finds a path between the locations and gets or computes the distance. It is possible, however, to define the duration of the activity and thus avoid the need to define a geography with travel paths. The engine calculates the duration of the trip and uses it to set the duration of the primitive move activity. When the agent or object reaches the new location, a new fact and belief are created stating that it is there. The agents currently at the new location detect the agent or object and will therefore also get a belief about its location. A newly-arrived agent will also detect the other agents and objects in the new location. The agent or object then continues with the workframe or factframe.

Brahms can handle interruptions that cause the location of an agent to change. Work that has to be done at a specific location may be interrupted and the agent may then move to another location to do work of a higher priority. When the higher-priority work is completed, before the agent resumes the interrupted work, the agent returns to the location where the agent has to do the work.

Primitive Communication Activities

Referring to FIG. 27, the predefined primitive communication activities transfer beliefs from one agent to one or several other agents, or to or from an information carrier object.

An agent can give and request information. One can think of the agent-to-agent and agent-from-agent communication primitives as modeling a simple conversation where agent A asks B to tell him anything B knows about subjects X (From), and likewise tells B anything that A knows about subjects Y (To). In either case, beliefs must be specified—in the first case to specify what beliefs will be transferred to the other agent or object, in the second, to match these beliefs against the beliefs of the agent or the beliefs of the object. Only beliefs that match the specified beliefs are transmitted. A belief specified in a primitive communication activity is deemed to match another belief under the same conditions that a workframe precondition of type known is deemed to match a belief. The specified beliefs are transmitted only if they are actually held. The transmitted beliefs overwrite any beliefs the recipient might have about the same object. Beliefs transferred to or from an object model information stored in or on the object. A model builder can use an information-transfer activity to model the reading of information from, or the writing of information to, a fax, paper, bulletin-board, or a computer system, for example. If transmitted beliefs contain variables that remain unbound in the preconditions of the recipient-initiator's workframe, then those variables are bound from matching beliefs supplied by the sender-responder.

Referring to FIG. 28, primitive broadcast activities work like primitive communication activities. Here, however, the acting agent is broadcasting all the beliefs that match those in the To set to other agents. There is no From set. One can think of the broadcast activity as modeling an agent shouting information to other agents.

When an agent broadcasts, the agent transmits beliefs to all other agents in the same geographical area (location) if the agent has a location, or to all other agents if the agent has no location. If an object broadcasts, the object transmits a fact about itself (e.g., a phone ringing), which will be received by the agents in the same location if the object has a location, or by all agents if the object does not have a location.

Agents, Groups, and Membership

Referring to FIG. 11, agents are generally used to model people and what they do. Agents may also be used to model interactive systems generally, including, for example, robots, animals, and computer-implemented processes. The attributes of an agent include those described in the following table 4.

TABLE 4

| | |
|---|---|
| All work | A list of all the workframes and thoughtframes that the agent at some point may perform. Any workframes or thoughtframes not in this list will never be performed by the agent. |
| Group memberships | A list of all groups of which the agent is a member. |
| Available work | A list of all workframe instantiations that the agent could work on at any given moment but has not yet started. |
| Impasse interrupted work | A list of workframes instantiations that have been interrupted by an impasse. |
| Interrupted work | A list of workframes instantiations that have been started, but have been interrupted due to the agent working on a workframe of higher priority. |
| Current work | The workframe instantiation that the agent is currently working on. |
| Completed work | A list of all workframes instantiations that have been completed by an agent. |

The statically-defined attributes of an agent include initial-beliefs, initial-facts, workframes, thoughtframes, and group memberships.

Referring to FIG. 12, groups have the same statically-defined attributes that define the activities of their member agents. When an agent is a member of a group, the agent inherits the group's initial-beliefs, initial-facts, workframes, and thoughtframes. A group can itself also be a member of a group, which in its turn can belong to other groups, constituting a group-tree. When a group is a member of a group, the member-group will inherit the attributes, initial-beliefs, initial-facts, workframes and thoughtframes from its parent groups. If the same construct is encountered more than once in the inheritance path, the one defined lowest in the path has precedence.

Artifact Objects and Conceptual Objects

Objects can model both tangible and conceptual things.

Referring to FIG. 13, an object class provides an inheritance mechanism for objects. Like groups, object classes define classes and allow the instances of the classes to share attributes, initial states, and behavior. In a model, a hierarchy of classes can be built by defining the class inheritance. A class can inherit from more then one class, so multiple inheritance is supported. A subclass inherits the attributes, relations, initial-beliefs, initial-facts, activities, workframes and thoughtframes from its parent classes. Private attributes and relations are not inherited, only public and protected attributes and relations are inherited. If the same construct is encountered more than once in the inheritance path, the one defined lowest in the path has precedence.

The resource attribute defines whether or not instances of the class are considered to be a resource when used in an activity (resource attribute is true) or whether the instances of the class are considered something that is worked on (resource attribute is false). The resource attribute is used in relation with the touched objects attribute for activities (described in reference to FIG. 24).

Referring to FIG. 14, objects are generally instances of an object class. Objects can also be created statically; they can also be created dynamically in the running of a workframe. Objects do not need to have behavior. An object representing a form or fax, for example, would have no behavior and no factframes.

Referring to FIG. 15 and FIG. 16, Brahms supports classes and instances of conceptual objects. Conceptual objects can be created by a model builder to permit the tracking of intangible things like tasks and orders. An artifact object (FIG. 14) can be linked to a conceptual object (FIG. 16) using the built-in relation is-a-conceptual-object of; thus, the model builder can dynamically link artifact objects that are instances of a concept with a conceptual object representing the concept. Both an object and a conceptual object can be part of one or more conceptual objects by defining the conceptual-object-membership for the object or conceptual object. This allows for later grouping of statistical results for the object with other objects in one conceptual object. When one of the built-in primitive activities copies an object, the simulation engine causes the copy to inherit the membership relation. In this way, the concept of an order can be linked to a particular instance, such as a piece of paper; and when the paper is transmitted by facsimile, for example, the created copy will also be recognized as an instance of the order.

Conceptual objects allow Brahms to be used for the generation of statistics, such as touch time, and the generation of object flows through a work process. Brahms generates these flows (also called task flows or process flows) from the execution of primitive activities that have touched objects associated with the conceptual objects. The use of a conceptual object allows a Brahms model builder to track things that exist as concepts, like an order, and have incarnations in the form of real artifacts, such as a fax, a form, or a database record.

Referring to FIGS. 24 (primitive activity), 25 (primitive create object activity), 26 (primitive move activity), and 27 (primitive communicate activity), a primitive activity can be defined to identify objects that are touched by the activity. When different objects representing real artifacts are touched by two different agents, at different times in the simulation, or through different primitive activities, Brahms can generate the flow of their conceptual object, and hence of the concept it represents. Brahms can also calculate the total touch time of a conceptual object. A conceptual object's touch time is the total touch time of all its related artifact objects. Similarly, duration time and other useful statistics can be calculated for a conceptual object.

Variables in Frames

Referring to FIG. 32, variables in a frame make the frame a template for activities or reasoning that agents and objects may perform. Variables may have quantifiers, as will be described below. The scope of a variable is bound to the frame it is declared in. Variables are inherited from the workframe in which they are declared by any composite activities and workframes within.

Brahms supports three quantifiers for variables: (1) for-each, (2) for-one, and (3) collect-all. The quantifiers can be used in preconditions, consequences, detectables, and information transfer and dynamic object-creation activities. The quantifier affects the way a variable is bound to a specific context (instance) of the defined type (object class) of the variable. A variable can be bound only to objects and not to values.

A for-each variable is bound to only one context, but for each context that can be bound to the variable, a separate workframe instantiation is created. Consider, for example, a precondition and workframe indicating:

variables: for-each (Order) order;

when ((order is-assigned-to Allen)) do work-on Order.

If three Orders are assigned to Allen, Brahms creates three wfi's, and in each wfi the for-each variable is bound to one of the three orders. This means that Allen works on one order at a time.

A collect-all variable can be bound to more then one context. The variable is bound to all matching contexts and only one wfi is created. Consider the previous example with a different variable declaration:

variables: collect-all (Order) order;

Brahms in this situation creates one wfi and binds the collect-all variable to all three orders. This means that Allen works on all three orders at the same time.

A for-one variable can be bound to only one context and only one wfi is created. A for-one variable binds to the first context found and ignores other possible matches. As far as the model builder is concerned, the selection is random.

When a precondition in a frame contains a variable of a certain class, any instance of that class can potentially serve as a binding for that variable. When creating frame instantiations, Brahms will create as many instantiations as there are valid bindings for the preconditions. If a frame has multiple variables that can be instantiated with several instances, Brahms will create frame instantiations for all valid combinations.

A variable may be declared as assigned or unassigned. An unassigned variable is unbound (that is, does not get a context) when a frame instantiation is created; an unassigned variable gets a context through a primitive communication or object creation activity, which binds the variable to a newly-created object.

Frame Instantiation States

As has been noted, frames (workframes, thoughtframes, and factframes) are stateless and serve as declarative definitions, whereas frame instantiations are dynamically created, associated with a particular agent-or-object, have state, and have a related context.

The possible states of a frame instantiation are set forth in the following table 5.

TABLE 5

| | |
|---|---|
| not-available | No instantiation exists for a given (frame, agent-or-object, context) set. Either the preconditions of the frame have no matches, or previously-active instantiations have all completed and been reset with no matches. |
| available | The preconditions of the frame have been satisfied for some context and agent-or-object, but the frame instantiation has not yet been started by the agent-or-object. |
| working | The agent-or-object is performing this frame instantiation for the current tick. |
| interrupted | The frame instantiation has already had at least one tick worked on it, but the agent-or-object is performing some other frame instantiation during the current tick. |
| interrupted-with-impasse | A detectable has caused the agent-or-object to have an impasse with the frame instantiation. The frame instantiation cannot continue until the condition causing the impasse is resolved. |
| done | The agent-or-object has completed all the activities in the frame instantiation. If the reset-when-done attribute of the associated frame is false, then the frame instantiation will exist in the done state. Otherwise, the preconditions will be evaluated and the frame instantiation will become either available or not-available (i.e., deleted). |

The allowable state transitions are listed in the following table 6, with their causes and implications.

TABLE 6

| | |
|---|---|
| not-available -> available | When the preconditions of a frame are satisfied for a particular agent-or-object and context, then a frame instantiation is created and put in state available. This frame instantiation can then be worked on by the agent-or-object. |
| available -> not-available | If an available frame instantiation has not been started, and the preconditions (which were previously satisfied) become unsatisfied, then the frame instantiation is deleted (and thus becomes not-available). |
| available -> working | If the frame instantiation becomes the current-work of an agent-or-object, then the frame instantiation has state working. |
| working -> interrupted | Whenever a different frame instantiation becomes the current-work of an agent-or-object, the (formerly) working frame instantiation becomes interrupted. Note that the agent can choose from the union of the sets (available, working, interrupted) for the current-work for the next clock tick. |
| working -> interrupted-with-impasse | This state change happens when the following conditions are all met: (1) an agent detects a fact, (2) the current working frame instantiation contains a detectable that references that fact, (3) that detectable is satisfied, and (4) the impasse-type attribute of the detectable is impasse. The agent cannot continue working on the frame instantiation until the impasse is resolved. The frame instantiation is set to interrupted-with-impasse state. |
| working -> done | When all activities of the frame instantiation are completed after the current-tick, then the frame instantiation becomes done if the reset-when-done attribute of the associated frame is false. Otherwise, the transitions working-> available or working->not-available are applicable, depending on whether the preconditions are satisfied. |
| interrupted -> working | When the agent-or-object picks an interrupted frame instantiation to become the current-work for the next tick, the frame instantiation becomes working again. |
| interrupted-with-impasse -> interrupted | When a belief of an agent causes the detectable that caused an impasse to be no longer satisfied, then the impasse is removed. The frame instantiation can be worked on once again, so the state is changed from interrupted-with-impasse to interrupted. |

Modeling a Conversation

Conversation interactions may be modeled with a set of generic activities and subactivities, which at the lowest level result in one or more primitive information transfer activities. General models of conversations, attached as workframes to groups, can indicate generally what gets transmitted, depending on the conditions and relations between the agents. To deal with an impasse (such as inability to contact the person), more abstract workframes may be appealed to. When contact is made and a conversation occurs, beliefs may be exchanged beyond those specified by the workframe. That is, an activity of "having a conversation of a certain kind" will be active, as well as the specific workframe or activity that caused the conversation to occur.

Figure 3:
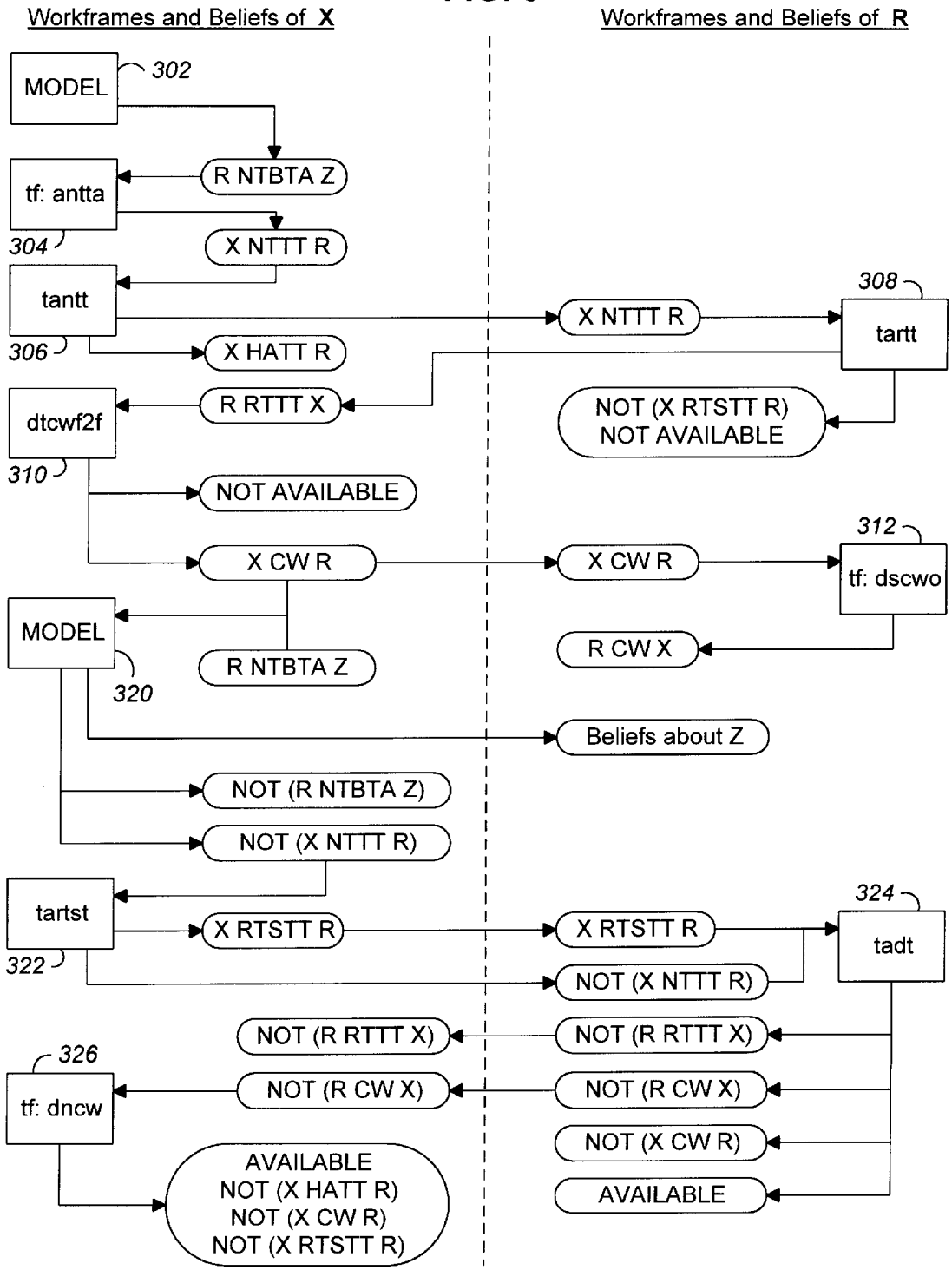
FIG. 3 is a schematic block diagram illustrating a Brahms conversation model.

These capabilities are illustrated in FIG. 3, which summarizes a generic model of workframes, beliefs, and thoughtframes that model a face-to-face conversation. The illustrated handshake protocol is a general way of representing a complex set of beliefs and state changes that occur in any coordinated interaction between people and things.

Here there are two agents, one initiating a conversation (X) and one responding (R). Each agent has frames and beliefs. Frames are represented by boxes; beliefs, in lozenges. Beliefs tested in frame preconditions are linked to frames by arrows pointing into the corresponding boxes. Beliefs generated by consequences of frames are linked by arrows pointing out of the corresponding boxes. If a consequence of a workframe of one agent points to a belief of the other agent, the receiving agent receives the belief by a primitive communication activity in the indicated workframe. Each agent has two states for each belief: true and false. The frames and beliefs of X are in the left of the figure; those of R, in the right.

The design of the illustrated protocol supposes that there are two workframes in a specific model that "invoke" the general purpose face-to-face frames. The first workframe 302 determines that someone needs to be told about something; the second workframe 320 transfers the information, shown in FIG. 3 as "Beliefs about Z" communicated from X to R. If the initiator has multiple things to talk about, this will trigger "need to talk about" repeatedly (before the "ready to stop talking" offer) and further transfers will occur without going through the handshake protocol.

Both agents have an initial belief that he or she is available for conversation, i.e., available is true.

Only those preconditions and consequences of the face-to-face frames are illustrated that show the essential nature of the protocol. Additional attributes indicate where agents are located and who is present in a given room, for example, so that face-to-face conversations occur only when people are together in the same place. For example, the workframe tantt 306 (tell agent need to talk) verifies that the potential respondent is in the same room.

The relations and attributes of the beliefs of the agents X and R are shown in the following table 7.

TABLE 7

| Relation or Attribute | Meaning and Comments |
|---|---|
| NTBTA | Needs To Be Told About. This is set within the specific workframe model that is using the general face-to-face module and then reset by the specific workframe that makes the communication within the module. Setting NTBTA "invokes" the face-to-face module. |
| NTTT | Needs To Talk To. |
| CW | Communicating With. This indicates that a conversation is occurring; in the respondent this may also mean that R is waiting for the initiator if X has become busy since saying NTTT. |
| HATT | Has Asked To Talk To. Like NTBTA, this is only believed by the initiator. |
| AVAILABLE | Conversation status is available or not. Note that the respondent locks up his or her status as NOT AVAILABLE when saying RTTT. |
| RTTT | Ready To Talk To. The general model could be extended by allowing this to be retracted, rather than locking up the respondent. |
| RTSTT | Ready To Stop Talking To. |

After workframe 302 has asserted R NTBTA Z (R needs to be told about something, namely Z), X has the precondition to execute thoughtframe antta (assert need to talk to agent) 304. This workframe asserts X NTTT R (X needs to talk to R). Then X in workframe tantt (tell agent need to talk)

306 asserts X HATT R (X needs to talk to R) and communicates the belief X NTTT R to R.

R receives the belief X NTTT R, which satisfies a precondition enabling execution of workframe tartt (tell agent ready to talk) 308, which asserts two beliefs: (i) NOT (X RTSTT R) (negate X is ready to stop talking to R), and (ii) NOT AVAILABLE (R is not available for conversation). R also communicates to X the belief R RTTT X (R is ready to talk to X).

X receives this belief, which satisfies a precondition enabling execution of workframe dtcwf2f (detect and tell communicating with (R) face to face) 310, which asserts the beliefs X CW R (X is communicating with R) and NOT AVAILABLE (X is not available for communication) and also communicates to R the belief X CW R (X is communicating with R).

R receives this belief, which satisfies a precondition enabling execution of thoughtframe dscwo (detect self communicating with other) 312, which asserts R CW X (R is communicating with X).

Now that each agent believes it is communicating with the other, X in workframe 320 can communicate the information that R needed to be told about (the belief R NTBTA Z asserted by workframe 302), and does so. When this has been done, the workframe 320 asserts NOT (R NTBTA Z) and NOT (X NTTT R).

In workframe tartst (tell agent ready to stop talking) 322, X then asserts X RTSTT R (X is ready to stop talking to R) and communicates to R the beliefs X RTSTT R and NOT (X NTTT R) (X does not need to talk to R). Although X has told R that X is done, X gives R a chance to make additional remarks. In thoughtframe dscwo 312, R had asserted R CW X when X had said X CW R, thus enabling R's workframes for communicating with X (not shown). Similarly, X can make additional comments in response.

R receives the belief X RTSTT R, which satisfies a precondition enabling execution of workframe tadt (tell agent done talking) 324, which asserts four beliefs: AVAILABLE (R is available for communication); NOT (R CW X) (R is not communicating with X); NOT (X CW R) (X is not communicating with R); and NOT (R RTTT X) (R is not ready to talk to X). The workframe tadt 324 communicates to X the latter two beliefs.

X receives the belief NOT (R CW X), which satisfies a precondition enabling execution of thoughtframe dncw (detect not communicating with) 326. This workframe asserts four beliefs: AVAILABLE (X is available for communication); X HATT R (X has not asked to talk to R); NOT (X CW R) (X is not communicating with R); and NOT (X RTSTT R) (X is not ready to stop talking to R).

The face-to-face protocol that has been is described is one of a number of protocols in a general Brahms communication model. Each protocol is a generic set of objects, attributes, and frames that can be incorporated in any Brahms model. The general protocol is a designed state-transition framework by which agents may initiate and verify the completion of each kind of communication. The model builder may use standard attributes to invoke the generic protocol, which then carries out the face-to-face conversation, the telephone connection, or other communication. For conversations, this protocol establishes the generic attribute CW (communicating with), which the model builder may then detect in other workframes that accomplish the desired specific communication.

A metaprotocol integrates the components of the communication model with each other and a specific Brahms model. This metaprotocol consists of three layers, or levels, of frames, as follows.

Level 1 frames have a high priority, greater than 2000. These are the workframes that detect "communicating with" (CW) and accomplish information transfer. An example of such a workframe, expressed informally, is: "If the current agent is communicating with (CW) a technician and the technician needs to be told about (NTBTA) a particular order, then tell the technician (information transfer activity) the due date."

Level 2 frames have a middle priority, between 1000 and 2000. These are the communication model frames that constitute the generic model of how a telephone conversation, facsimile transmission, face-to-face conversation, and other communications operate. These are handshake protocols with semaphore protection. For example, any agent's belief of needing to talk to (NTTT) another agent who is in the same location will trigger the face-to-face protocol, which was described in reference to FIG. 3. The agent will tell the other agent "I need to talk to you" (NTTT). The other agent, if available (a semaphore protection), will respond, "I am ready to talk to you" (RTTT). On hearing this, the initiator responds, "You are communicating with me" (CW).

Level 3 frames have low priority, less than 1000. These are all the other frames in the Brahms model. Included here are workframes that assert NTTT and thereby invoke the communication model, which by virtue of its higher priority frames interrupts the level 3 workframes. When the communication model asserts "communicating with", this invokes the information transfer workframes, which by virtue of higher priority interrupt the communication model.

Thus, through priorities and interrupts, both general (level 2) and specific (level 3) frames are integrated and coordinated. More specifically, talk activities are used as placeholders in the level 3 and level 2 workframes to provide a place (or time) in which interruption can occur—correspondingly, to set up the communication and then to effect the information transfer.

The protocols allow flexible operation, such that when an agent asserts NTTT, the method used (such as telephone, fax, face-to-face) will be context specific. This leads to a more complex design of three workframes within the level 1 base workframes. A first workframe asserts: (I need) (current agent needs) to talk to (NTTT) other agent, and (ii) other agent needs to be told about (NTBTA) something. A second workframe has the preconditions: if communicating with other agent and other agent NTBTA something, then accomplish the information transfer (ask or tell). The information transfer will be done by an information transfer workframe at level 3. A third workframe at level 1 must make the phone call, when necessary; informally, the workframe says, if current agent NTTT other agent and is not in the same location, then call the other agent, talk, and hang-up.

Thus, if the agents are in the same location, the face-to-face protocol will be invoked by the first workframe and the desired information transfer will occur through the second workframe. If the agents are not in the same location, the third workframe will make the connection, and again at the appropriate time the second workframe will bring about the information transfer. It might appear that one could simply move the third workframe to level 2, so every NTTT results in making a call if the agents are not in the same location. But this is not what is wanted. Sometimes an agent concludes NTTT and then waits for the other agent to call.

Alternatively, one could add another relation, such as "need to initiate conversation", that would trigger at the generic level a workframe like the third workframe.

With separate availability attributes for telephone and face-to-face communications, agents may engage in both telephone and face-to-face conversations at the same time with different people. Thus, an agent may talk on the phone while having a face-to-face conversation. In real life, this involves a interruptions; in Brahms, it appears as an interleaving of the two activities. This is done in these communication models because they are incorporated in models that are run with large simulation time steps, such as 5 minutes.

The mechanical operation of a phone is used as a handshake to establish a phone conversation (e.g., a busy signal indicates not ready to talk) in a general phone protocol. The face-to-face protocol could also have been used to establish a phone conversation. For example, agents could say "hello" to establish a synchronized conversation.

Finally, it should be noted that communication objects (e.g., telephones) are modeled in factframes rather than being implemented in the language itself. This allows the general tracing and monitoring tools to be used by observers of a running model to track the state of communications. For efficiency, the generic frames can be pre-compiled.

A Library Model for Fax Communication

A Brahms model can represent and simulate the work activities of people and organizations at a very fine granularity. This means that the creation of a Brahms model is not a trivial matter, and that a model builder may need to model many kinds of different interactions and ways of working that involve agents and artifacts in the world, such as faxes, telephones, computer systems, and so on. For this reason, a model builder will find it advantageous to use libraries 112 (FIG. 1) of predefined Brahms models. Library models can be merged by a model builder into an existing or a new model, to make the functionality of the library model available to the model builder without requiring him to create it himself.

Table 8, below, shows an illustrative fax model, suitable for use in a model library, that enables agents to send faxes to each other in a realistic way. In this model, the following steps are taken by the sender, the machines, and the receiver to fax a document. The sender of the fax has to: (a) know that he has to fax something to the receiver, (b) go to the fax machine, and (c) fax and wait till the fax is done. The fax machine of the sender has to: (a) connect to the receiver's fax machine, (b) send the fax, and (c) let the sender know whether the fax has been send successfully. The fax machine of the receiver has to: (a) receive the fax, and (b) copy the faxed information to a document. An agent needs two beliefs for the fax model to start working: the agent needs to believe that it has to send a fax; and the agent needs to believe that the receiving agent needs to receive the fax.

Basically two workframes are defined to allow an agent to send a fax: Send-A-Fax and Retrieve-A-Service-Request-Fax. The latter is specific for type of object that can be faxed because the agent needs to know what type of fax object he is retrieving from the fax machine. The Send-A-Fax workframe allows an agent to perform the faxing activity. The faxing activity starts after the agent gets the belief that it needs to send a fax, shown in the precondition. The activity ends when that belief is set to false, in the consequence. The Retrieve-A-Service-Request-Fax workframe allows an agent to retrieve an object of a "ServiceRequestFormFax" object class. The workframe is in the AllGroups group, so that any agent member of this group can receive a ServiceRequestFormFax fax. The agent is modeled as picking up all faxes addressed to the agent.

The composite activity "faxing" describes what kind of object can be faxed, and how that is done. For illustration, it has only one workframe FaxServiceRequestFormToTS, for faxing a service request to a technical support person. This performs the primitive activity "faxingServiceRequest", which takes only as long as it needs to, with a maximum task time of 300 seconds, because the detectable "fax-sent" detects the transmission status fact of the fax machine. The fax machine object creates this fact as soon as it has sent the fax. One consequence of the workframe creates the facts that will start the fax machine; the other undoes the belief for the agent that it has to fax the object, to prevent the agent from faxing the object more than once.

Agents that send such faxes are modeled as being in the group SalesReps. This groups has a thoughtframe to assert the belief that the object has been faxed, that is, to undo the belief that the receiving agent needs to receive the fax.

The object class FaxMachine is a template for individual fax machine objects. Three workframes in this class perform the activities of sending and receiving a fax. One sends a fax; one broadcasts that a fax has arrived, and one notices that the faxed object has been picked up, in order to know to stop broadcasting.

```
model FaxModel:
group AllGroups:
    display-text = "All Groups";
    attributes:
        public boolean needs-to-send-a-fax;
    relations:
        public ServiceRequestForm needs-to-fax;
        public ServiceRequestForm needs-to-receive-fax;
    workframes:
        Send-A-Fax:
            display-text "Send a fax";
            repeat = true;
            variables:
                    assigned for-one(FaxMachine) faxMachine;
                    assigned for-one(Building) fmloc;
            when
                // preconditions
                (known-value(The needs-to-send-a-fax of current = true) and
```

-continued

```
                known-value(faxMachine is-the-fax-machine-of current) and
                known-value(The location of faxMachine = fmloc))
            do
                // body
                faxing(faxMachine, fmloc); // a composite activity
                conclude((The needs-to-send-a-fax of current = false), bc=0);
                conclude((The transmission-status of faxMachine equals done);
            end; // do
        end // Send-A-Fax
        Retrieve-A-Service-Request-Fax:
            display-text = "Retrieve a service request fax";
            repeat = true;
            variables:
                    assigned for-one(FaxMachine) faxMachine;
                    unassigned collect-all(ServiceRequestFormFax) srFax;
            when
                (known-value(faxMachine is-the-fax-machine-of current) and
                known-value(The fax-machine-status of faxMachine
                = has-fax-waiting) and
                known-value (The location of current = the location of
                faxMachine))
            do
                communicate infoTransferWithFaxMachine(faxMachine, srFax,
                current);
                pickUpFax (faxMachine, srFax, current, 5);
                conclude ((The fax-machine-status of faxMachine
                = has-no-fax-waiting));
                conclude((The has-been-picked-up of srFax = true), bc=0);
                conclude((srFax is-a-fax-for current), bc=0);
            end; // do
        end // Retrieve-A-Service-Request-Fax
    activities:
        communicate pickUpFax(FaxMachine f;
                            ServiceRequestFormFAX srFax,
                            AllGroups agt,
                            int dur):
            display-text = "Info transfer with fax machine";
            max-duration = dur;
            with = f;
            receive(srFax is-a-fax-for agt);
        end // pickUpFax activity
        composite-activity faxing(for-one(FaxMachine) fm,
                    for-one(Building) loc):
            end-condition = no-work;
            workframes:
                FaxServiceRequestFormToTS:
                    display-text = "Fax service request form to TS";
                    repeat = false;
                    variables:
                        assigned for-each(Agent) agt;
                        assigned for-each(ServiceRequestForm) sr;
                    detectables:
                        fax-sent:
                            when whenever
                            detect ((The transmission-status of fm = successful))
                            then complete;
                        end // fax-sent
                    when
                        (known-value(agt needs-to-receive-fax sr) and
                        unknown(current has-to-fax sr is FALSE))
                    do
                        moveToLocationOfFax (loc);
                        conclude ((sr needs-to-be-faxed-to agt), bc=0);
                        conclude ((fm has-to-fax sr), bc=0);
                        faxingServiceRequest(300);
                        conclude ((current has-to-fax sr is FALSE), fc=0);
                    end; // do
                end // workframe FaxServiceRequestFormToTS
            activities:
                move moveToLocationOfFax(Building b):
                    display-text = "Move to location of fax machine";
                    goal-location = b;
                end // moveToLocationOfFax
                primitive-activity faxingServiceRequest(int md):
                    display-text = "Faxing service request";
                    max-duration = md;
                end // faxingServiceRequest
        end // composite-activity faxing
end // group AllGroups
```

-continued

```
group SalesReps member-of AllGroups:
    display-text = "Sales Representative";
    relations:
        public ServiceRequestForm needs-to-receive-fax;
    thoughtframes:
        AssertFaxIsSent:
            display-text = "Assert fax is sent";
            repeat = true;
            variables:
                assigned collect-all(FaxMachine) fm;
                assigned for-each(Agent) agt;
                assigned for-each(ServiceRequestForm) sr;
            when
                (known-value(The transmission-status of fm = successful) and
                known-value(agt needs-to-receive-fax sr) and
                known-value(The needs-to-send-a-fax of sr is FALSE))
            do
                conclude((agt needs-to-receive-fax sr is FALSE));
            end; // do
        end // AssertFaxIsSent
end // group SalesReps
class FaxMachine:
    display-text = "Fax machine";
    attributes:
        public symbol fax-machine-status;
        public symbol transmission-status;
    relations:
        public ServiceRequestForm has-to-fax;
        public AllGroups is-the-fax-machine-of;
    workframes: //for sending/receiving faxes by a fax machine
        SendServiceRequestFax:
            display-text = "Send service request fax";
            repeat = true;
            variables:
                assigned for-each(Agent) agt;
                assigned for-each(ServiceRequestForm) sr;
                assigned for-one(FaxMachine) fm;
                assigned for-one(Building) srFaxLoc;
                unassigned for-one(ServiceRequestFormFax) srFax;
            when
                (known-value(current has-to-fax sr) and
                known-value(sr needs-to-be-faxed-to agt) and
                known-value(fm is-the-fax-machine-of agt) and
                known-value(The location of fm = srFaxLoc))
            do
                createFax("copy", sr, srFax);
                conclude((srFax is-a-fax-for agt), fc=0);
                InfoTransferWithFaxMachine(fm, agt, srFax, 60);
                conclude((The fax-machine-status of fm = has-fax-waiting));
                conclude((The transmission-status of current = successful));
                conclude((srFax is-a-fax-for agt is FALSE), fc=0);
                conclude((current has-to-fax sr is FALSE), bc=0);
                conclude((sr needs-to-be-faxed-to agt is FALSE), bc=0);
            end;//do
        end // workframe SendServiceRequestFax
        BroadcastFaxWaiting:
            display-text = "Broadcast fax waiting";
            repeat = true;
            when
                (known-value(The fax-machine-status of current
                = has-fax-waiting))
            do
                conclude((The fax-machine-status of current = has-fax-waiting),
                    fc=0);
                broadcast FaxWaiting(current);
            end; // do
        end //workframe BroadcastFaxWaiting
        SRFaxBeingPickedUp:
            display-text = "SR Fax being picked up";
            repeat = false;
            variables:
                assigned for-each(ServiceRequestForm) srFax;
                assigned collect-all(Agent) agt;
            when
                (known-value(The fax-machine-status of current
                = has-no-fax-waiting) and
                known-value (The has-been-picked-up of srFax = true) and
                known-value (srFax is-a-fax-for agt))
            do
```

```
                conclude((The fax-machine-status of current
                    = has-no-fax-waiting), fc=0);
                conclude((srFax is-a-fax-for agt is FALSE), fc=0);
                PickedUpFax(current);
            end; // do
        end // workframe SRFaxBeingPickedUp
    activities:
        create-object createFax(symbol act, ServiceRequestForm form,
        ServiceRequestFormFax fax):
            display-text = "Create fax";
            action = act;
            source = form;
            destination = fax;
            when = end;
        end
        communicate InfoTransferWithFaxMachine(FaxMachine fm, Agent agt,
                                ServiceRequestFormFAX srFax, int md):
            display-text = "Info transfer with FaxMachine";
            max-duration = md;
            with = fm;
            send( (srFax is-a-fax-for agt))
        end
        broadcast Faxwaiting(FaxMachine f):
            display-text = "Broadcast fax waiting";
            send(The fax-machine-status of f = has-fax-waiting);
        end
        broadcast PickedUpFax(FaxMachine f):
            display-text = "Picked up fax detection";
            send(The fax-machine-status of f = has-no-fax-waiting);
        end
end // class FaxMachine
class ServiceRequestForm:
    display-text = "Service Request Form";
    relations:
        public AllGroups needs-to-be-faxed-to;
end // class ServiceRequestForm
class ServiceRequestFormFax:
    display-text = "Service Request Form Fax";
    attributes:
        public boolean has-been-picked-up;
        public boolean needs-to-send-a-fax;
    relations:
        public AllGroups is-a-fax-for;
end // class ServiceRequestFormFax
end // model FaxModel
```

Intelligent Agents

Figure 4:
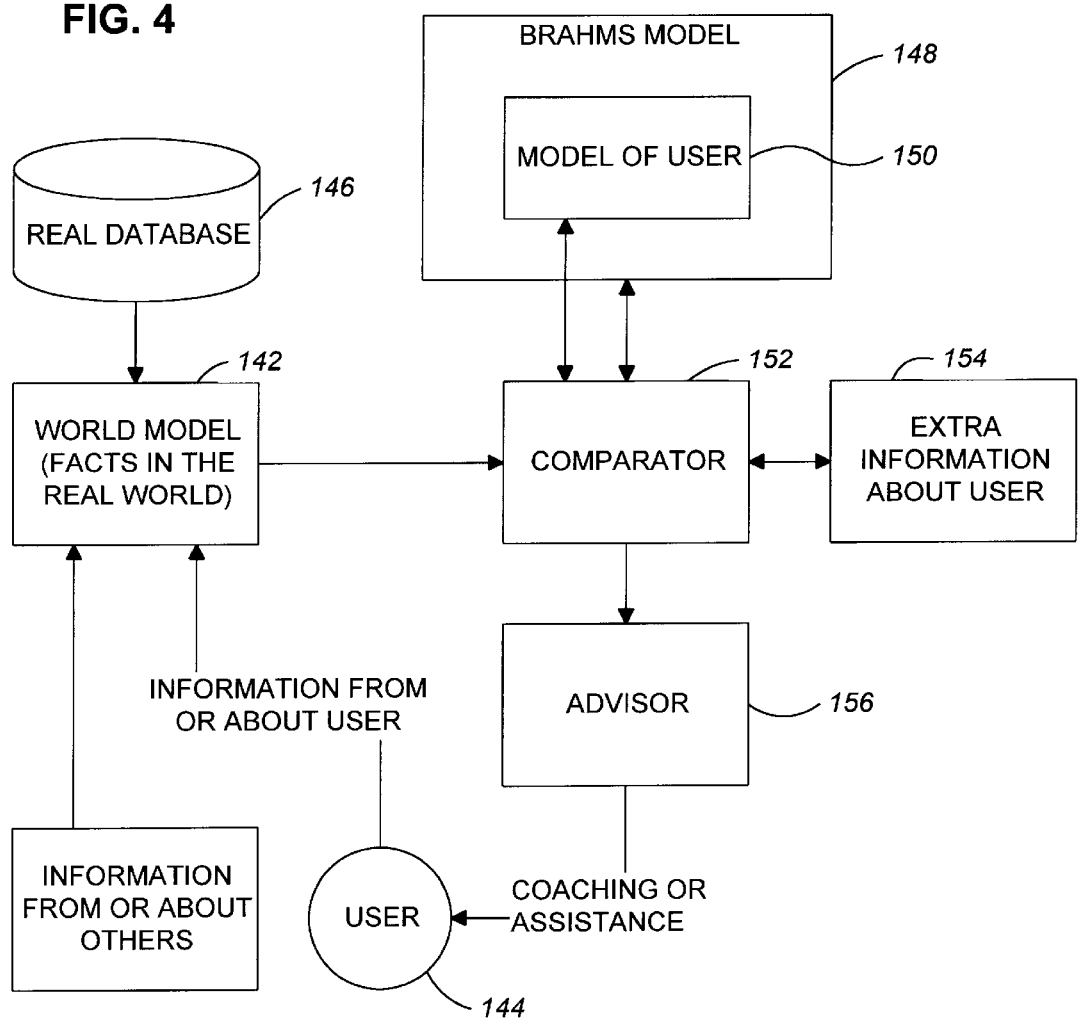
FIG. 4 is a block diagram illustrating of Brahms in an intelligent agent application.

Referring to FIG. 4, the Brahms technology can be used to build what is known as an intelligent or software agent. An intelligent agent can function anywhere on the continuum between an assistant and a coach, generally for a particular person, a human user, but it may also serve a robot, an animal, or a computer-implemented process. At one end of the continuum, an assistant tries to help by doing work; at the other end, a coach provides advice or comment. The intelligent agent is built by extending conventional ITS (intelligent tutoring system) technology to use Brahms models in place of previously known technologies for modeling the human user and the source of expert knowledge.

As is conventional in an intelligent tutoring system, a world model 142 maintains a record of facts about the real world, including information about the actions of the user 144. For particular embodiments, factual information may be obtained from or about others, including other users, from databases 146, or from other real sources, and provided to the world model 142. A Brahms model 148 includes an agent model 150 of the user: as does every Brahms model of an agent, the user agent model has two components, a general component 108 and a situation-specific component 110 (FIG. 1). The general component is a model of an idealized agent having the role or tasks of the user. The situation-specific component provides a description of the state and the beliefs of the user. The general component stands in place of the expert system or other previously-known source of predictions in an intelligent tutoring system. The general component begins as an idealized model, which a comparator process 152 may modify to represent variations in practice, using conventional explanation-based learning techniques. The situation-specific component includes, in addition to the items normally found in a Brahms agent model, further information 154 that is used and maintained by the comparator. This additional information indicates, for example, which of the agent's beliefs are incorrect, which of the beliefs that the agent should have are missing, the history of the agent's activities, and the interests and preferences of the user, such as the areas in which the user would like assistance. The comparator runs the models in a forward-looking mode, for prediction, and in an explanatory mode, to support its diagnostic and didactic functions. The comparator compares predictions generated by the model with the actions of the user. Differences, issues, or problems that are of interest are identified by the comparator, and these are formulated by an advisor process 156 to provide assistance or teaching to the user 144.

Among the advantages of using Brahms models in this way are the following. A Brahms model models activities and not simply problem solving through reasoning. A Brahms agent is modeled as interacting in a world and exploiting social knowledge in interacting with other Brahms agents distributed in a modeled geography. By integrating the world model and the Brahms model with each other and with real objects and sources of information, a Brahms agent modeling a user is able to receive facts the user would be interested in (as modeled by the agent's workframes and thoughtframes); and an intelligent agent observing these conditions could then provide the information to the user.

The usefulness of this may be seen by considering an intelligent agent tied to an orders database. The intelligent agent runs the Brahms simulation to develop and maintain a world model (of objects, their states and locations) and models of workers (beliefs, activities, and locations) who process orders. The intelligent agent advises an order coordinator by electronic mail when an urgent order has arrived. This is done by applying the order coordinator's workframes to the new order (detected on the real order database) to see what actions the coordinator would take if he saw the order now. Further, having a model of the coordinator, the intelligent agent knows where to try to reach him or who might know where he is. In this way, the intelligent agent can capitalize on the representation of social relationships. To make the system more useful to them, the people who are modeled could use the Brahms relation builder and other tools to give the intelligent agent beliefs about themselves.

An intelligent agent acting as a coach could consult a Brahms model of an experienced worker in a user's job. With a PDA (personal digital assistant) linked to the coach (intelligent agent) by wireless connection, the user can receive coaching as he moves about performing his job. The user could use the PDA to get suggestions on sources of information, job priorities, procedures, people to talk to for advice, and so on. The intelligent agent, having a model of the user's activities, can provide teaching or assistance on request or, optionally, at occasions such as missed milestones. In another application, such a coaching intelligent agent could be embedded in a training simulation where the user plays the role he is learning.

An intelligent agent can be programmed as a Brahms model or it can be programmed in a different language. Programming an intelligent agent as a Brahms model allows the intelligent agent to be modeled in terms of its activities (what the intelligent agent does when), which is advantageous insofar as the intelligent agent must interact with people and hence its actions are dependent on the time of day, location, and other social considerations. Representing the intelligent agent as a Brahms agent is also advantageous for requirements analysis: to determine gaps and bottlenecks in work practice, to find opportunities for new communications, and to predict the effects of using an intelligent agent in different ways. Thus, in designing an information technology such as a PDA, for example, Brahms provides a tool to model a context of use in which the new technology is integrated in a model of practice that includes intelligent agents.

Defining Relations

A relation-builder module allows a model builder use a graphical user interface to specify initial facts and beliefs graphically by drawing and naming links representing relations between displayed objects. The module creates a relationship model based on the links, from which facts and beliefs are derived as will be described later. The module also provides a user interface view of the relationships between agents and objects during a simulation run.

Geography

A geography module allows the model builder and the end user to model locations in the physical world and relationships between locations. The scope of the graphical geography is basically limited to a city. Connectivity between cities is established and displayed through connectivity tables rather than graphically.

Graphically, a city has a city map grid. Level-1 objects are those that can be placed on the city map grid. A level-2 object is one that can be placed on or in a level-1 object. A level-3 object is one that can be placed on or in a level-2 object, and so on. A level can be looked upon as an user interface view. When a user zooms in on a level-3 object, the user sees the level-4 objects that are placed on or in the level-3 object.

A city map is a 3-dimensional grid (X, Y, Z). The grid has a scaling factor, so distance and travel time can be indicated. Travel time depends on distance and means of transportation and may also be affected by the elevation angles of road, train tracks, and other paths.

Geographical objects generally fall in one or more of the following groups: areas, transportation-related elements, general elements, and artifacts.

An area is a super-class for buildings and pseudo-buildings. An area can have zero or more instances of "exit-entrance". An exit-entrance leads to a path-part, such as part of a street, railroad track, or river, for example.

Buildings are level-1 objects. They are composed of floors and do not have grids. A building has a minimum of one floor by default. Buildings are placed alongside paths, such as roads, water ways, train tracks. The exit or entrance of a building has a relation with one of the path-parts that are positioned alongside the building. A pseudo-building is a level-1 object but does not have floors or rooms.

Floors are level-2 objects that are composed of rooms and have a 2-dimensional grid. A floor has a minimum of one default floor-room.

Rooms are level-3 objects. A room has a 3-dimensional grid. To allow modeling a window that does not reach from the ceiling to the ground, or an artifact like a white board hanging on a wall, the Z-coordinate of a room has a minimum value of 2.

An artifact is a level-4 or level-5 object that can be placed anywhere, subject to restrictions related to the nature of the artifact. If an artifact has a grid, another artifact can be placed on top of it.

Transportation-related elements can roughly be divided into the following categories: vehicles, transportation-related buildings, and transportation paths. A transportation path is a level-1 object that is a route or surface on which vehicles can move. It has at least one connecting path-part and can be one of the following types: aerial route, water way, rail, pedestrian path, road (for automotive vehicles), and don't-care. A model builder not interested in simulating transportation can use don't-care paths, which are direct connections.

Transportation-related buildings can be used as a medium or transfer connection to move from one transportation path to another. A transportation-related building connects two or more path-parts not necessarily belonging to the same (kind of) path, without a direct physical connection. Transportation-related buildings include airports, train stations, subway stations, harbors, and tram or bus stops.

Vehicles are level-2 objects. Vehicles are container artifacts that can contain agents and artifacts. Vehicles can have limited cargo capacity. Vehicles can be divided into the following groups: automotive, water, air, rail-based, and don't-care vehicles.

General geographical elements are level-1 objects that enable a model builder to create a geographical landscape that resembles an actual landscape. Such elements may include bodies of water, which can function as paths or as decorative obstacles; hills, which can influence the speed with which certain vehicles can travel; and obstacles such as trees and bushes.

Agents can move through the entire geography. An agent has the functionality of a container artifact and can carry other artifacts. The number of artifacts an agent is able to carry depends on the artifacts' weight and the nature of the artifacts. An agent can also be placed inside an artifact such as a car.

Whenever an agent enters a geographical location, such as a room, the simulation engine does the following: it generates a fact that the agent is in that location, it generates a belief for that specific agent that it is in that location, and it generates that same belief for all other agents in that location. The geography may be implemented to limit the generation of beliefs to other agents in the immediate environment of the specific agent.

Referring to FIG. 33, an area definition is used for defining area constructs used for representing geographical information in a model. Area definitions are similar to classes in their use. Examples of area definitions are 'Building', and 'Floor'.

Referring to FIG. 34, an area represents a geographical location and is used to create a geographical representation for use in the model. An example is 'NewYorkCity'. An area is an instance of an area definition. Areas can be decomposed into sub-areas. For example, a building can be decomposed into one or more floors. The decomposition can be modeled using the part-of relationship.

Referring to FIG. 35, a path connects two areas and represents a route that can be taken by an agent or object to travel from one area to another. The model builder may specify distance as the time it takes to move from area1 to area2.

Running a Simulation

Figure 6:
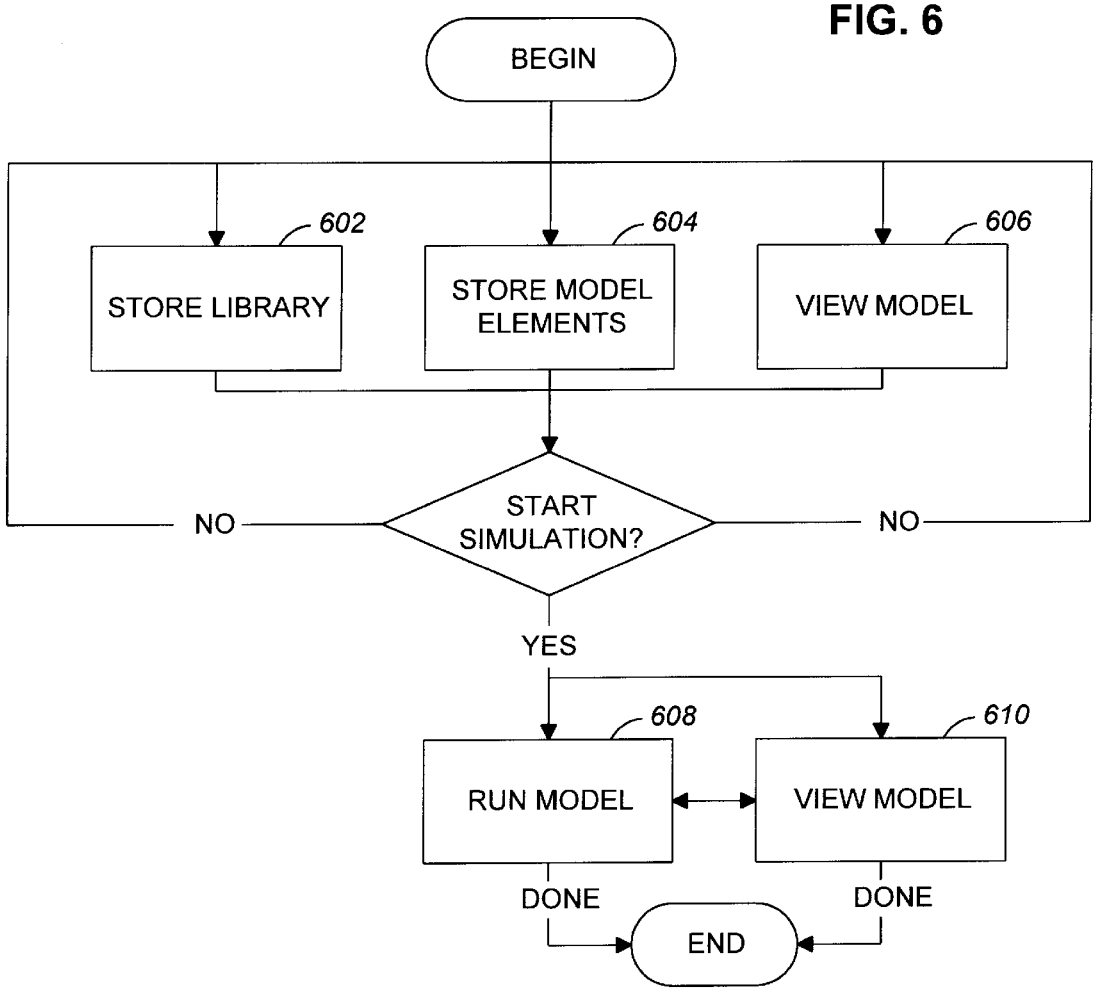
FIG. 6 is a high-level flow chart showing preparation and running of a Brahms model.

Referring to FIG. 6, model behavior on a computer system, which may include one or more computers, includes the optional step 602 of storing in computer memory model modules from a model library, step 604 of storing in computer memory model elements for the particular model, in step 606 of optionally viewing and editing the model elements as or after they are stored. These tests may be repeated multiple times and in essentially any order. When the stored model is ready to be simulated, the model is run, step 608, and optional simultaneously viewed, step 610, until the simulation is done.

Figure 7:
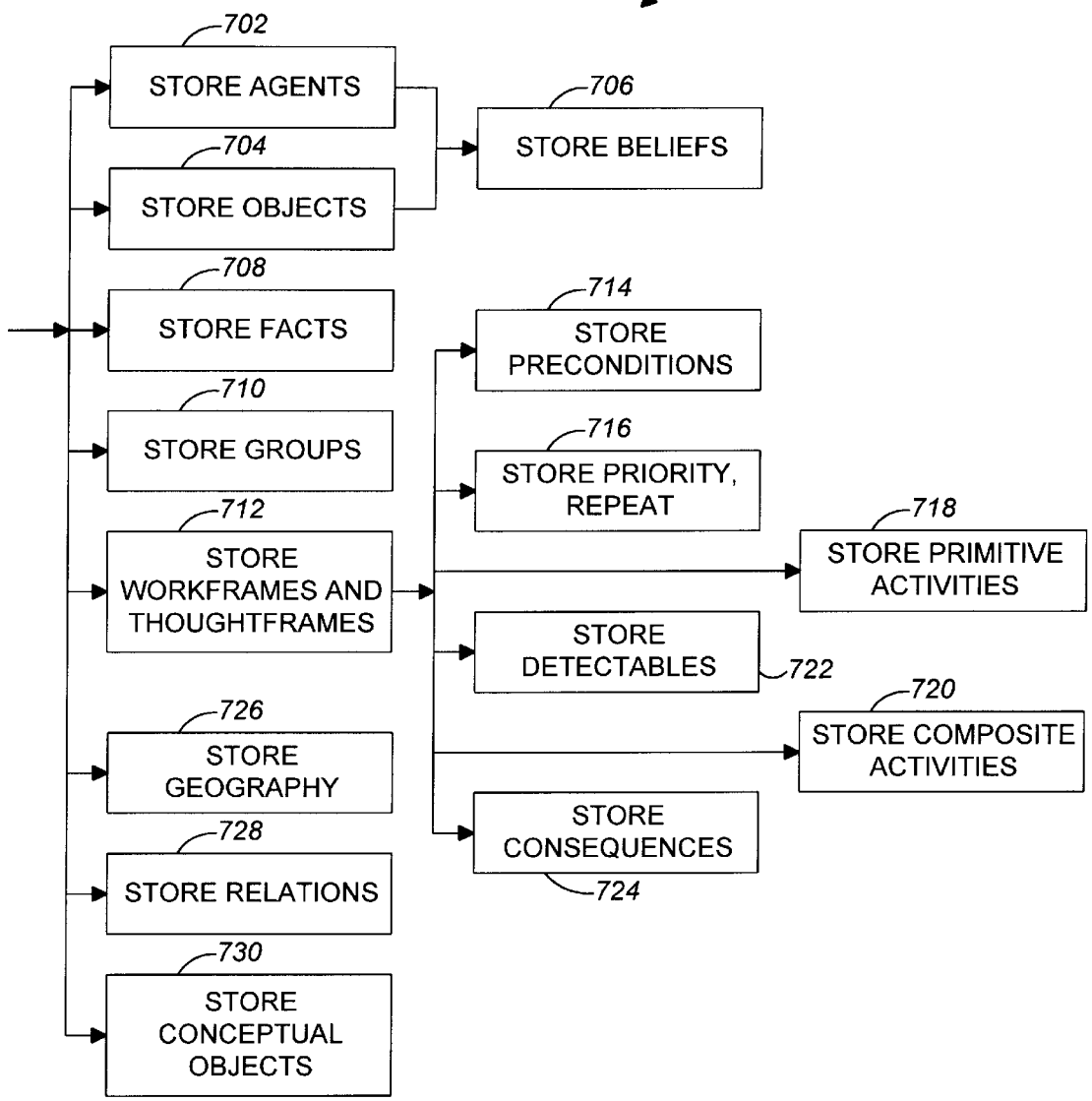
FIG. 7 is a flow chart showing steps of preparation of a Brahms model for running.

Referring to FIG. 7, step 604 of storing model elements in computer memory generally includes storing agents (702), storing objects (704), storing beliefs for agents and objects (706), storing facts (708), storing proofs (710), storing workframes and thoughtframes (712), this generally includes storing preconditions (714), storing priorities and other attributes (716), storing primitive activities (718), storing composite activities (720), storing detectables (722), and storing consequences (724). Further substeps of the step of storing model elements may also include storing geography (726), storing relations (728), and storing a conceptual objects (730).

Figure 8:
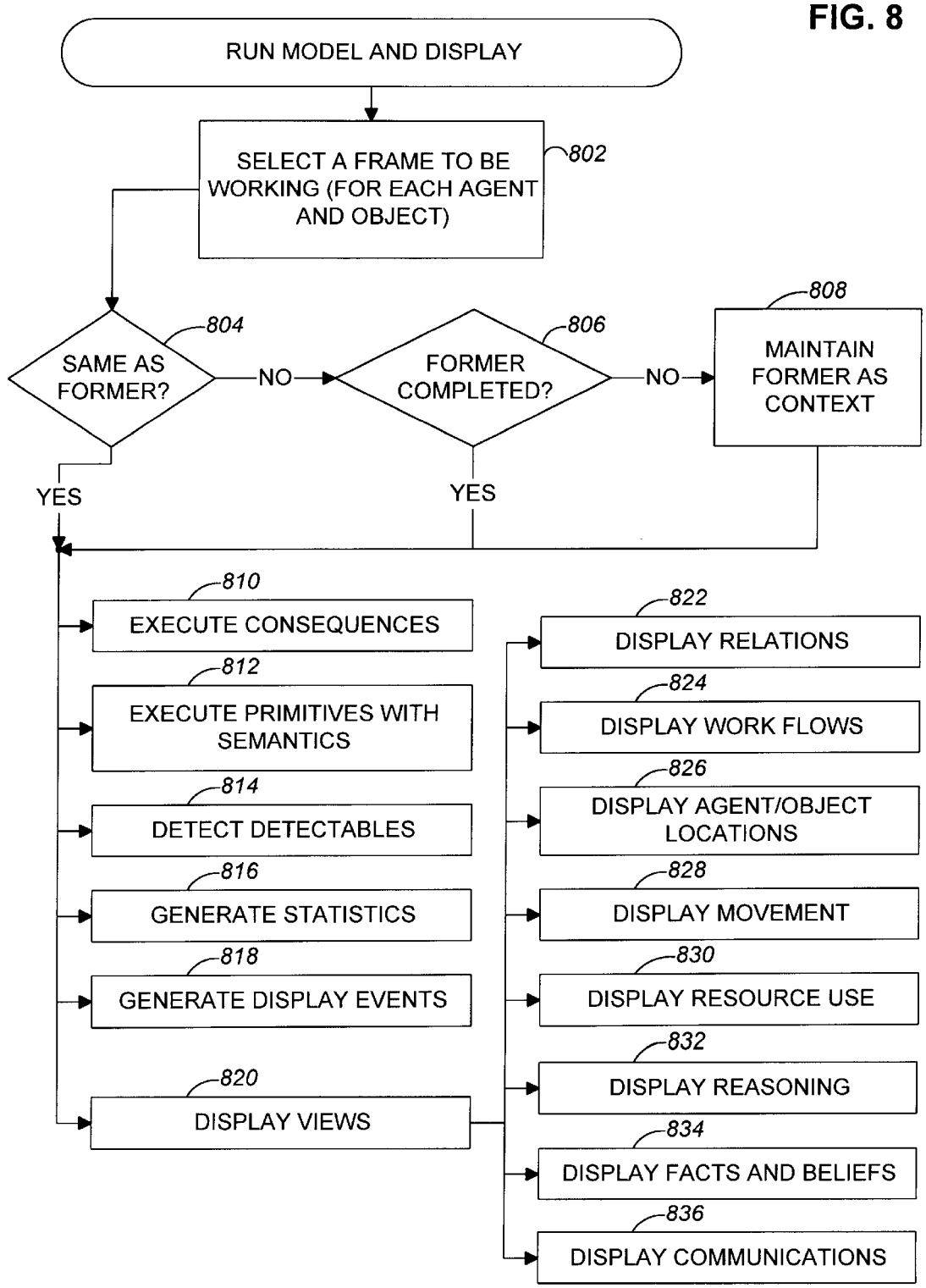
FIG. 8 is a flow chart showing steps of running a Brahms model.

Referring to FIG. 8, the steps of running and viewing a model select for each time in the simulation a frame to be the working frame performed by each agent and object with behavior (802). If the selected frame is not the same as the former working frame (804), and the former working frame is not completed (806), the former working frame is maintained as part of the activity contacts for the agent or object (808). Turning to the selected frame, in running the model any one or more of the following action may occur. Consequences of the selective claim may be executed (810), primitives with semantics may be executed (812), detectables may be detected and their actions given effect (814), statistics may be generated based on properties of the selective claim, its current activity, the detection of detectables, and other events (816), semi and display events may be generated noting the events and state transitions that have occurred in the course of performing the selected frame. The running model may be observed through views that are displayed, for example through a graphical user interface (820). The displaying of views may include one or more of the following. Typically in response to a request from an observer of the model. A display of views may also encompass the production of reports and statistics for later analysis. The display of views may include a display of relations (822), a display of work flows (824), a display of these locations in a geography of agents and objects (826), a display of movements of agents and objects in a geography (828), a display of the use of resources (830), a display of reasoning, that is, the formation of the beliefs by agents and objects (832), a display of current and changing of facts and beliefs (834), and a display of communications between or among agents or objects (836).

Monitoring a Simulation

A running simulation of a Brahms model can be observed from a number of graphical views provided by the user interface. Simulation displays in Brahms are generally event-driven: display events are generated by the simulation engine as it executes a model when events of potential interest occur. In the style of programming environments, breakpoints can be set to alert the observer to user-selected events. In addition, statistics are collected of the kind familiar in conventional work process modeling tools, and these can be displayed in tabular form. Finally, the entire population of agents and artifacts can be inspected by use of tables and graphs showing their attributes at a time or over time.

One set of views provides a map-based interface. Maps show views of agents and objects situated and moving in geography. Agents are shown creating, searching, and modifying artifacts and information. A user can zoom in on a geography or other map to see details about agents and objects, including documents and artifacts. When a simulation is running, a user may inspect any agent to determine the state of the agent.

The map view has a palette of tools to allow a user to inspect or change the modeled world, one layer at a time or in combination. A trail layer, for example, allows one to observe the path of a particular agent. An inspection tool offers the choices of inspecting, cloning, tracking, or editing any agent or artifact.

Besides viewing the 3-dimensionality of the world in terms of places, a user may zoom in on details at the desk level. Brahms does not model how objects are placed at this level of detail; the display is just to show what is at a location.

A different view is provided by a history window, in which key events are listed, as on a stack, with the most recent history on top.

A graphic interface shows movements and other changes in the style of the well-known SimLife™ program, from Maxis of Walnut Creek, Calif. The simulation engine keeps a history and statistics (depending on what the modeler builder specifies) about how and when certain events occur. Observers may track agents, activities, information, or artifacts through space and time. It is possible to pause the simulation, edit any portion of it, save the current state, and return to an earlier state. Active annotations (specified by modeler builders) pop up to alert observers that some event has occurred. An explanation subsystem enables observers to inquire whether and why events occurred.

The interface of Brahms is designed to reveal a line of reasoning about work practices. The observer can stop the simulation and probe to find out the content of a particular conversation or status of the jobs being worked on. Constraint violations on quality of work can be represented and used as detectors to inform the person watching the simulation that something interesting has occurred. The user interface allows editing the characteristics of agent roles and individual agents doing them. The user may also make annotations about the model. Various census graphs allow studying interactions between different agents, such as impasses, backlogs, assistance provided, and inhibitory interactions. Agent capabilities may change through their interactions. The observer can record and see the path of any particular agent over time. The observer can single out agents and study them, or just focus on the dynamics of a group. One view summarizes the workday from any agent's perspective, providing a kind of ethnographic view of what is happening.

In an alternative view, the observer can see a representation of the processing of a task, in which the work of individual agents is chained together into a task model. This representation is computed automatically from the agent-group-activity models. The observer can see the number of jobs being processed on colored meters or can step through to follow a single job (order). The observer can set up detectors to count the numbers of objects of a class with different characteristics at a given time (e.g., machines installed but not working) and request statistical summaries.

Order of Execution

An order of testing and execution must be imposed in any simulation tool on conditions and operations that in principle apply or occur simultaneously. The following paragraphs describe the order in which the parts of a workframe are evaluated or executed in an implementation of Brahms.

Preconditions are the first things checked in a frame. They are checked in the order in which they are declared within the frame. When all of its preconditions match (i.e., are satisfied), a frame to become available.

After the preconditions match and a workframe is selected, the frame will start to work. The working time will be specified in the frame; or, if the frame contains any composite activities, the working time will be the cumulative time of the executed composite activities. At any time during this working time, a variety of things may happen. Consequences may be asserted, facts may be detected, and communications may occur, depending on their ordering in the then part of the frame. If the then part includes one or more location goals, the agent or object will go to the specified locations as the location goals are executed.

Within a detectable the model builder can specify when the agent or object can detect a fact. When a frame contains a composite activity, the model builder must specify the time to be "whenever", because the engine cannot calculate the total working time for the frame in advance.

When multiple detectables are declared within a frame, they are checked in the order in which they are declared. When two detectables are specified to be executed at the same time, and the first states that the frame should be interrupted and the second states that the frame should be aborted, the frame will be interrupted.

The then part of a frame is ordered, and the simulation engine evaluates the then-part components in the order in which they are declared. The then part may include activities and composite activities, and consequences that will be asserted as beliefs and/or facts.

The Brahms Simulation Engine

The simulation engine of Brahms emulates a parallel-operation engine that operates on agents and objects. The unit of granularity of the simulation is the tick, which represents some amount of simulated time, such as five seconds or five minutes. The Brahms engine has a main loop that is executed once per tick.

In addition to the main loop, Brahms has a number of procedures that are activated when certain events occur. For example, the procedure reason-from-belief is activated for a particular agent when that agent has a new or changed belief. Most of the simulation displays in Brahms are event-driven as well.

Simulation Engine Initialization

A user of the Brahms system initializes the engine to start the simulation of a model. The current-values of fact and belief values are set to their initial values in the procedure init-value. By default, every model imports a BaseModel library containing base constructs for groups and classes and containing standard classes and relations. Ever agent in a model is by default a member of a BaseGroup defined in the BaseModel library. The BaseGroup defines attributes, initial-beliefs, initial-facts, workframes and thoughtframes as defaults for agents and groups.

All agents in the model are put in the list-of-agents. Then, for each frame in the model, relations are defined between the frame and the conditions on the frame, including preconditions, fact-preconditions, detectables and consequences. In the graphical interface, the frame elements are shown as being placed on a frame, which placement is made by the model builder. If an ordering between elements relative to each other is needed, their relative y-positions are used to define the order.

Frame initialization puts the preconditions and consequences defined on frames and in ordered lists. Consequence properties define how a consequence changes the world, how it changes the agent's beliefs, when it is asserted, and whether it is asserted.

Next, the activities on each workframe are put in a list called 'activities' of the frame. A 'checked-before' relation is created between consequences and activities for consequences that have to be executed before an activity starts.

The detectables on each workframe are put in the list 'detectables' of the frame.

Next, the work-priority of each frame is set based on the priorities of the primitive activities and the composite activities of the frame. The work-priority of a workframe is the priority of its highest priority primitive activity or composite activity.

Then frame initialization generates for each frame a list of the wf-variables and a list of agent-or-objects that are defined on the frame and used in a precondition (i.e., bound). A list of unbound variables and a list of agent-or-objects are also generated: these contain wf-variables and agent-or-object variables that are not used in preconditions and are therefore unbound. A list of unassigned wf-variables is also generated. These lists are all linked to the frame.

Then, objects are initialized by a procedure that adds the appropriate factframes in the 'all-work' list of each object and creates the facts and beliefs for the object based on the initial facts and initial beliefs defined for the object or the object class. This procedure also starts the reasoning process for the objects, possibly making frame-instantiations available for the objects to work on in the first clock tick.

Next, relation-facts are initialized and initial facts and beliefs are created, which may be based on links drawn in the relation-builder model. If a link is not directional, two facts are created (A <relation> B), (B <relation> A). If the link is directed, only one fact is created. If A or B or both are agents, corresponding beliefs are created for the linked agent(s).

Then, all the work for the agents is initialized as was done for objects. The group-membership tree is traversed for each agent adding the appropriate workframes into each agent's 'all-work' list. Initial beliefs and facts are created for agents, including inherited facts and beliefs. The reasoning process is started for agents, possibly making frame-instantiations available for agents to work on in the first clock tick.

In geography initialization, location facts and beliefs are created for each agent and object that is located in the geography model. Initialization also ensures that each agent detects its environment.

Then the simulation engine initializes the time beliefs and has the user set the start time of the simulation in hours, minutes, seconds, day of the week, and day of the year.

The Main Loop

For each agent and for each object, the simulation engine's main loop selects and executes the work in the next clock tick. The body of the procedure is set forth in the following table 9.

TABLE 9 conclude that new-fact-in-current-tick = false;
call work-selection-loop();
conclude that current-time = current-time + clock-grain-size;
call increment-simulation-time();
call work-completion-loop();
call factframe-completion-loop();
conclude that new-fact-in-previous-tick = new-fact-in-current-tick;

Work Selection

The procedure work-selection-loop selects the work for each agent by finding a workframe instantiation (wfi) for the agent. Each agent has three lists of work: available work, current work, and interrupted work. The items in these lists are wfi's. Each wfi has its own three lists of available, current, and interrupted work, each of which lists is also a list of wfi's. These lists can form a tree of parents and children, because a workframe can have composite activities that contain workframes. The lists of a parent contain the instantiations of the currently active composite activity of that parent instantiation. This is illustrated in the following table 10.

TABLE 10

If
    agent is working on workframe WF1;
        WF1 has a composite activity AF1;
            AF1 has workframes WF2, WF3, and WF4; and
                WF2 is the current work;
                WF4 was interrupted when WF2 was selected; and
                WF3 is available but was not interrupted.
Then the lists are,
    for agent,
        current work: WFI1 (wfi of WF1);
    for WFI1,
        available work: WFI3 (wfi of WF3);
        current work: WFI2 (wfi of WF2);
        interrupted work: WFI4 (wfi of WF4).

The available, current and interrupted work lists are only used when the wfi has children, as does WFI1 in the example above. The available work is a list of wfi's representing work that is available to work on, but is not worked on yet. The current work is a list of the one wfi on which the agent is currently working. The interrupted work is a list of wfi's that have been interrupted for some reason and that can be reactivated after some condition is met.

For each agent, work-selection-loop first processes the agent's belief queue. The procedure process-belief-queue creates beliefs for the agent for each belief-transfer-item in the agent's new-belief-queue list. The belief-transfer-item is an intermediate belief that is used as a basis for the later creation of beliefs. Belief-transfer-items can be created as a result of broadcasting an observable fact, transferring a belief between agents, transferring facts to agents, and by consequences and detectables. When new beliefs are created, process-belief-queue then reasons with the new beliefs by calling reason-from-belief-list to determine whether any frame instantiations should be made available or unavailable.

Next, work selection selects the wfi with the highest priority. The procedures for doing so are indirectly recursive:

find-highest-priority-wfi calls find-wfi-with-highest-priority-from-list, which calls find-highest-priority-wfi.

Find-highest-priority-wfi finds the highest priority wfi in the available, current, and interrupted work. It returns root-wfi, lowest-wfi, and arb-root, which are used to change the wfi-tree structure to set the work for the next tick. Lowest-wfi is the childless wfi that has the highest priority and hence is the wfi that will be set to working in the next tick. Root-wfi is the wfi right below the agent in the tree containing the lowest-wfi. Arb-root (arbitration root) is the parent wfi of lowest-wfi. Wfi's in the three lists of arb-root may have to be moved to different lists if lowest-wfi takes the place of a different wfi in arb-root's current-work list.

When wfi's are found with the same highest priority, current work takes precedence, interrupted work follows, and available work comes last.

Find-highest-priority-wfi starts by selecting the highest priority wfi in the available work (if there are available wfi's) at the current level of recursion. It does so by calling find-wfi-with-highest-priority-from-list, which first sorts the wfi's by priority and then traverses each wfi in the list. If a wfi has a child wfi, the procedure calls find-highest-priority-wfi for the child wfi, causing the indirect recursion, which will again try to find the highest wfi in the three lists (available, current, and interrupted work) of the child wfi. Find-wfi-with-highest-priority-from-list returns the wfi with the highest priority (this will be found at the bottom of the tree and is therefore called lowest-wfi), the parent wfi of lowest-wfi, the priority of lowest-wfi, and whether there is an arbitration root. If a wfi has no children, then the procedure returns that wfi as lowest-wfi, that wfi as parent, its priority, and the value false, indicating that there is no arbitration root. This ends the recursion.

Next, the procedure find-highest-priority-wfi goes through a similar process for the current work and interrupted work lists. In the end, one highest priority wfi will be identified in each of the three lists. These wfi's are compared and one is selected.

Next, the work for the agent is set by setting the highest priority wfi to be the current work of the agent and switching wfi's in the three lists of arb-root, if necessary. The status of the wfi's (working, available, interrupted) is updated, display events about the status are created, and, if necessary, the previous current work wfi is interrupted.

The procedure work-selection-loop performs a similar process for objects having factframes, but without calling the procedure process-belief-queue.

Work Completion

Most of the simulation takes place in the workframe completion loop. The workframe completion loop performs the following five functions for each agent.

1. Sets the global variable current-agent to the agent.
2. Calls advance-workframe-time to increase either the total-work-time or the unspecified-time of the current-agent, as well as either the activity-elapsed-time or the transit-time of the current wfi. In addition, this procedure calls check-detectables and check-consequences for the current wfi.
3. Calls check-workframe-completion to check for and handle the various finishing events that can occur.
4. Calls process-thoughtframes to traverse the wfi's in the available-work list of the current-agent looking for thoughtframe instantiations. It asserts the consequences of each one it finds.
5. Calls process-belief-queue.

The factframe completion loop loops over the objects having factframes and performs virtually the same functions as does the workframe completion loop.

Advance-Workframe-Time

Advance-workframe-time is a recursive procedure that starts with the agent and continues with the wfi's of the agent. This procedure traverses every wfi in the current-work list. For each wfi, it first checks whether the agent is moving. If so, it updates the transit-time of the wfi, increases the unspecified time of the agent, and creates a display event stating that the agent is in transit. If not, it checks whether an activity has just started and, if so, creates the appropriate display event. Then it increments the activity-elapsed-time and the total-elapsed-time of the agent and of any child wfi.

If the wfi has no child wfi's, the total-work-time of the agent is increased by the clock-grain-size; otherwise, another current-work list has to be traversed and advance-workframe-time is called with the current wfi as the input argument.

At the leaves of the tree (where the wfi's have no children), advance-workframe-time checks the detectables, calls process-belief-queue (detectables create new beliefs, which can change the availability of wfi's), and then, if a detectable did not end the wfi, checks the consequences and again calls process-belief-queue (consequences can create new beliefs, which can change the availability of wfi's).

If there is no current work at all for the agent, the unspecified-time of the agent is incremented by the clock-grain-size.

Check-Workframe-Completion

Check-workframe-completion is a recursive procedure that starts with the agent and continues with the wfi's of the agent. If there is current-work, this procedure traverses each wfi in the list of current-work.

If the wfi is working, the procedure checks whether the agent is working on an activity. If so, and if the agent is working on a primitive activity and the time to work on that activity has passed, the activity is recognized as being completed finish-current-activity is called, which finishes the activity and sets up the next activity. If the agent is working on a composite activity, check-workframe-completion calls itself recursively until a primitive activity is encountered.

If on return from the recursion check-workframe-completion has a wfi that is a composite activity, and no work is left in the composite activity and the no-work-end attribute of the composite activity is true, then the composite activity will be finished as well by a call to finish-current-activity. If the no-work-end attribute is false, a composite activity is finished only when an activity detectable is satisfied.

Check-workframe-completion then checks the consequences of the current wfi, processes the belief-queue of the agent, checks the detectables of the current wfi, and processes the belief-queue again. If there are no more activities to work on, the wfi is finished by a call to finish-workframe.

Finish-Current-Activity

The procedure finish-current-activity removes the activity from the list of current-activities of the current wfi. If the removed activity is a composite activity that needs to be finished, finish-activity-frame is called, which removes relations between the composite activity and its wfi's, which can then be deleted. The completed activity is inserted in the list of completed activities and a display event is created stating that the activity is completed. If no activities remain in the list of uncompleted activities, the workframe is completed by calling finish-workframe. Otherwise, finish-current-activity moves the first (highest priority) activity in the list of uncompleted activities to the list of current activities. A display event is created stating that this next activity will be initialized. Before the initialization, the consequences for the current wfi are checked and the belief queue of the agent is processed.

Then, if the next activity is a composite activity, the composite activity is initialized. The activity-elapsed-time is set to zero for the new activity. Relations between the composite activity and the wfi are set up and workframes in the composite activity are reasoned with.

Finish-Workframe

When a workframe is completed, if the reset-when-done attribute of the workframe is false, the wfi and any sub-wfi's are aborted, the wfi is moved to the completed work list of the agent, and a display event is created stating that the workframe is completed. If the reset-when-done-attribute is true, on the other hand, the workframe is checked for restart by matching its preconditions with the beliefs of the agent and determining whether the preconditions are still met.

If the workframe preconditions are satisfied, the old wfi's are aborted and a new wfi is made available. If collect-all variables are used in the preconditions, whether other similar wfi's are available is checked, and if so their variable collect-all bindings are added to the bindings of the wfi to be made available and the similar ones are aborted. This is done so that all contexts are bound to one variable in one wfi, when possible. (A wfi is considered similar to another if they are instantiations of the same workframe and have different bindings to the collect-all variables). If the first activity of the wfi is a composite activity, then the consequences of the current wfi are checked, the belief-queue is processed, and the composite activity is initialized. A display event is created stating that the wfi is made available.

If the workframe preconditions of the workframe are not met, the wfi is aborted, the workframe is finished, and a display event is created stating this.

Process-Thoughtframes

The procedure process-thoughtframes determines whether the current agent has available thoughtframes. If the agent does, the procedure asserts the consequences in the list of unchecked consequences of each thoughtframe instantiation by matching those consequences with the beliefs of the current agent. Each workframe and thoughtframe instantiation has a list for each of unchecked consequences, unchecked detectables, checked consequences, and checked detectables.

Once the thoughtframe is executed, process-thoughtframes checks whether the reset-when-done attribute is true and, if so, determines whether the thoughtframe can be made available again for executing in the next clock tick. A display event is created stating the result. This process is similar to that of finish-workframe. If the reset-when-done attribute is false, the thoughtframe is ended, its status is set to done, and a display event is created stating so. This procedure is recursive and checks thoughtframes in sub-wfi's, starting with the highest level wfi.

Check-Detectables

Detectables are checked the first time a wfi is worked on, when a new fact is asserted, and when a wfi changes state from interrupted to working. The procedure check-detectables first checks whether the unchecked detectables of the wfi can be detected. A detectable is only checked if the when-activated attribute is set to 'whenever' or when the time has come to check the detectable. If either condition is met, the detectable is matched against the facts in the world and the detectable is put in the list of checked-detectables.

Next, the procedure checks whether a new fact was created in this clock tick. If so, the 'whenever' checked-detectables are checked again.

Finally, if the current-activity of the wfi is a composite activity, the detectables of the composite activity are checked. If a detectable is not an end-activity detectable, the same procedure described above is used to check the detectable and to detect it. If the detectable is an end-activity detectable, then the procedure checks if the end-activity condition is met and, if so, it ends the current activity by calling finish-current-activity.

Check-Consequences

The procedure check-consequences checks the consequences in the list of unchecked consequence of a frame instantiation. It checks a consequence if there are no more activities to be executed in the instantiation or if the consequence is defined as having to be checked before the current activity.

The procedure check-consequences checks each of the consequences and causes them to be asserted. This may cause a fact, and, if necessary, a corresponding belief, to be created; or it may simply cause a belief to be created. After the consequence has been handled, it is moved to the list of checked-consequences of the current wfi.

Handling of Activities

Activities respond to a specific set of events including start, end, interrupt, continue, impasse, and continue-from-impasse. When a primitive activity is started, the duration of the activity is set in the frame instantiation. Certain activities have further specialized behavior at the start-activity event. The communicate activities and create-object activity have specialized start behavior when the model builder defines the activity's action as taking place at the start of the activity.

The interrupt and impasse events cause the duration of the activity to be placed in the interrupted-duration of the frame-instantiation and the activity-elapsed-time to be placed in the interrupted-activity-elapsed-time of the frame-instantiation. If the interrupted frame instantiation had a move activity, it is possible that when the frame-instantiation begins working again (a continue event), the agent will first have to move to the proper location again. The interrupted times allow the continuing activity's statistics to be preserved over the possible intervening move activity.

The continue and continue-from-impasse events cause the interrupted-activity-elapsed-time to be set to the activity-elapsed-time of the frame-instantiation and the interrupted-duration to be set to the duration of the frame-instantiation.

The procedure handle-create-object handles special behaviors for create-object primitive activities. The procedure creates a new instance of the source object or object class designated in the activity and initializes the instance with the source's initial beliefs and facts. The created object is assigned to an unassigned variable in the workframe in which the create-object activity is defined. This variable is given the attribute assigned.

The procedure handle-move handles special behaviors for move primitive activities. If the current location is, or is a sub-location of, the goal location, then nothing further needs to be done; otherwise, the agent or object moves to the location goal. The total-travel-time is first calculated and serves as the activity duration, which is set in the frame-instantiation. To calculate the travel time, if the current area and the goal location area have the same parent, the procedure attempts to find a path between the two areas. Otherwise, it determines whether a direct path joins the two parent areas. If not, it tries to find an indirect path between connected areas and the goal location area. The travel-time is calculated while determining the path by adding the distance of the path-parts in the travel-path. The fastest path is chosen and the travel time for that path is returned.

Reason-From-Belief-List

The procedure reason-from-belief-list finds all the preconditions that might possibly be satisfied by a new belief in a belief list. This is done by matching preconditions to the left-hand-side of the new beliefs. The procedure reason-current-detectables-from-belief is then called to determine, based on the new beliefs, whether wfi's need to be impassed, interrupted, completed, or ended, and whether any pending impasse can be resolved.

Those frames associated with the current agent that have any of the previously-found preconditions then have their preconditions evaluated by a call to reason-workframe, or by a call to reason-workframe-with-contexts if the frame is a sub-frame. These determine whether all preconditions for a frame instantiation are met and, if so, make the frame instantiation available.

Event-Driven Engine

Figure 5:
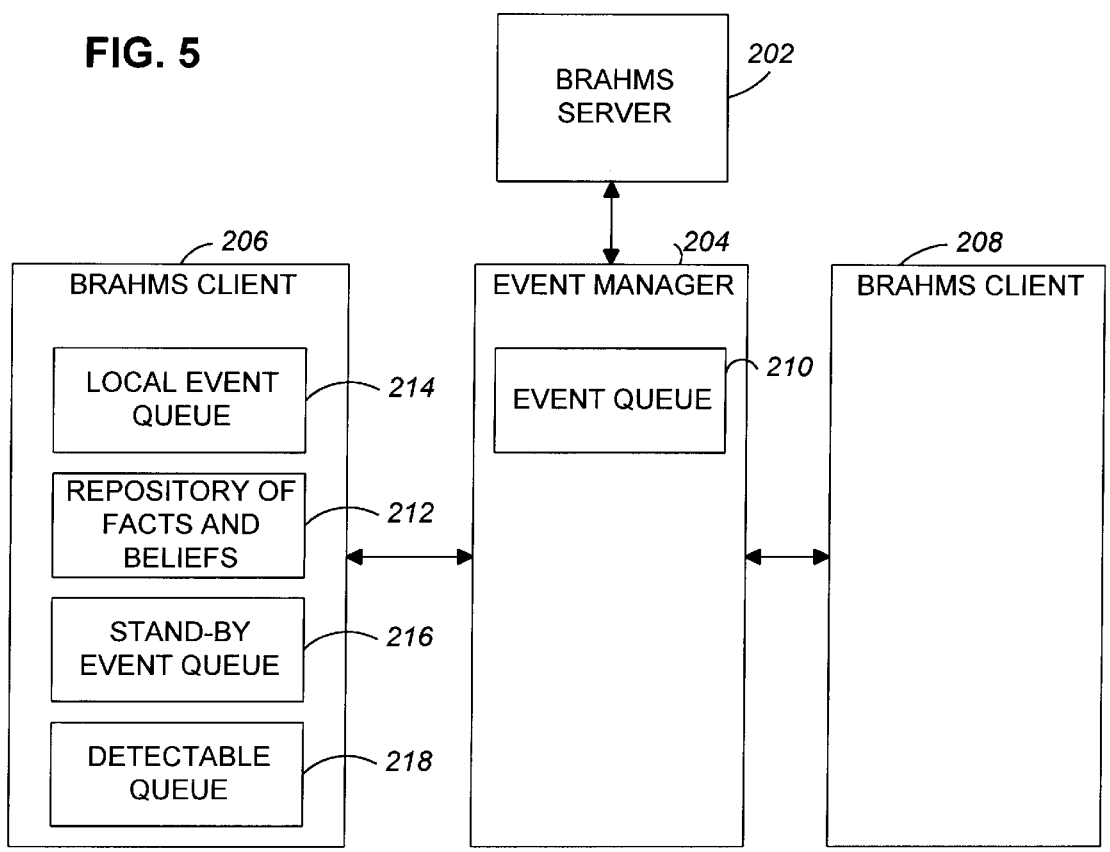
FIG. 5 is a block diagram illustrating a client-server, event-driven engine embodiment of Brahms.

Referring to FIG. 5, Brahms is implemented in an alternative embodiment on the familiar paradigm of event-driven simulation. The implementation has three principal components: the Brahms server 202, the event manager 204, and the Brahms client 206 or 208. These components may all reside on one computer, or they may be distributed over a network. For one Brahms server, there may be more than one event manager, and for each event manager, there may be more than one Brahms client.

The Brahms server can manage one or more simulation runs in parallel. Each simulation run is managed by an event manager. A Brahms client requests to take part in a simulation run by providing a model-identification (usually the model name). If no simulation with that model-identification is running, the Brahms server will set up a new simulation run. It starts a timer to allow time for other Brahms clients to join the simulation, which they do by providing the same model-identification.

Each event manager 204 manages one simulation run in which one or more Brahms clients 206, 208 participate. The event manager manages one event queue 210, on which events of the following types can be found: belief events, fact events, and work-related events. In an event, the target is the Brahms client for whom the event is intended.

Belief events specify a (time, target, belief) triple and are distributed only to the specified target. In case of a broadcast, the same belief will be added to the event queue with a belief event for each target managed by the event manager.

Fact events specify a (time, fact) tuple and are distributed to all the Brahms clients managed by the event manager.

Work-related events for activities specify a (time, target, activity) triple, and work-related events for frames specify a (time, target, frame) triple. Both kinds include a start, end, interrupt, continue, impasse, and continue-from-impasse events.

The event manager receives events from the different Brahms clients and distributes them to their specified targets. The event manager keeps the timing between the Brahms clients synchronized.

A Brahms client performs work based on the events that it receives. A Brahms client can be an agent or an object, and in particular it can be an intelligent agent as described above, such as an application retrieving information from a database and converting it to beliefs for distribution to other Brahms clients when so requested.

Each Brahms client has a repository 212 of facts and beliefs received during the simulation, and it stores its state locally. A Brahms client only acts on events coming in from the event manager. The following description of a client assumes that work is activated by beliefs, but the description applies equally to facts when activation is based on facts. When a belief is received, the client goes through the same work selection process described above in reference to the clock-tick based simulation engine. The client checks its work (its frames) to see what can be made available or unavailable and goes through a selection process to select the work to work on, possibly interrupting its current work. Based on this selection, work-related events are generated and sent to the event manager. For example, if work is interrupted, an interrupt event is sent to the event manager, for the frame or the activity or both, as applicable. If the client starts new work, a start frame event is sent to the event manager and also a start activity event for the first activity in the frame. Because the duration of the activity is known, the client also sends an end activity event to the event manager for the activity.

The client maintains an event queue 214 with the events that it posted to the event manager. This is used in managing interrupts, as described below. If a frame is interrupted, the client puts the events that are still on the event queue for that frame in a stand-by event queue 216, which is also managed by the client. The events that are moved from the local event queue to the stand-by queue by the client will also be removed from the event manager's event queue because the event manager only manages current events. The time-stamp for each event in the stand-by queue is changed to be (time+delta), where delta is the scheduled time of the event minus the time of interrupt. Later, when the work selection process moves an interrupted frame to its current work, the events for the interrupted frame in the stand-by queue are moved to the event manager queue 210 and the local queue 214, and 'time' is instantiated with the 'current time' and the calculated delta is added.

When a frame is started, its detectables are put in a detectable queue local to the client. When a fact is received by the client, the client checks the detectables in the detectable queue and, if possible, creates the necessary belief events and puts those on the event manager's event queue and the local queue. Beliefs that come in to the client are also checked against the detectables because they may cause the second part of a detectable to be executed and cause events to be created and sent to the event manager. When a frame is ended, the detectables belonging to the frame are removed from the detectable queue. The detectables of a composite activity are also added to the detectable queue when the composite activity is started and are removed when the composite activity is ended.

The design and architecture of the event-driven engine provides for faster execution than does that of the clock-tick engine. Among other things, procedures to advance workframe time and check for work completion are not necessary in the event-driven design. The design is also advantageous for the implementation of distributed intelligent agents. The intelligent agent Brahms client may be distributed not only to a separate computer on a network, it may also be distributed to a portable computer or a PDA that is connected to the site of a Brahms server and event manager by a wireless or an intermittent connection, allowing an extensive freedom of movement by the user of the agent.

G2 Implementation

In the clock-tick driven implementation described earlier, Brahms is implemented in a number of G2 workspaces on which are displayed icons representing, i.a., agents, groups, buildings, and workframes.

Each agent or group has its subworkspace, which has one or more initial-belief-workspace objects, in each of which may be any number of initial beliefs. Each agent or group also has one or more workframe-workspace objects, in each of which may be any number of workframes or thoughtframes. Each agent or group also has one or more group-membership-workspace objects, in each of which may be any number of group-membership-icons, each of which corresponds to a group that the particular agent or group is a member of.

The principal container class for objects is focus-object. Each object has a set of facts, which are located on the subworkspace of the focus-object. Condition, fact, and belief classes are represented in the style of a relational database. This reduces the memory usage by not replicating common data. In addition, since G2 provides efficient collection of object-instances based on an indexed key, traversing the database is efficient during simulation, using the serial-number as the index of a particular instance.

The agent-or-object class is the top-level container class for agents and focus-objects. It has the following G2 attributes: serial-number, class-number, and object-type; the lists new-belief-queue, all-work, available-work, interrupted-work, current-work, completed-work, impasse-interrupted-work, and group-memberships; the counters total-work-time, and unspecified-time; and unit-cost and unit. Total-work-time is time spent working on frames; unspecified time is any other time. Unit-cost is cost per defined time unit, and unit is the defined time unit in seconds.

The wf-relation class is used to create a relation between the left-hand-side and right-hand-side of a fact or belief value. The attributes of the wf-relation class include serial-number, the name used for the relation-builder module; the user-defined plain text representation of the wf-relation, which is the text shown to the user in dialogs.

The comparison class is used to describe a relation, but not to store the relation itself. The comparison class is used to describe the structure of fact-values, belief-values, and conditions. The structure of a comparison is <left-hand-side> <relation> <right-hand-side>. The <left-hand-side> can be a reference to an object or an object-attribute pair. The <right-hand-side> can be a reference to an object or an object-attribute pair, or state whether the <right-hand-side> has a value. The <relation> can refer to any wf-relation, built-in or user-defined.

The fact-or-belief-value class is a container class for its two subclasses, fact-value and belief-value, which are the classes that hold the actual value of a fact or belief. In essence, the comparison says "the due-date of some order= some value", while the fact-value says "the due-date of order-5 is Thursday".

The belief class exists to describe the relationship between agent-or-object and belief-value to allow belief-value instances to be held by multiple agent-or-objects. Attributes of the belief class are: the serial-number of the agent-or-object that holds the belief-value; the serial number of the comparison that describes the belief-value, and the serial number of the specific belief-value held by the agent-or-object.

The frame class is a container class for workframes, thoughtframes, and factframes. Its attributes include serial-number, reset-when-done, preconditions, activities, detectables, and consequences. Reset-when-done is a logical flag corresponding to "repeat=true". The preconditions, activities, detectables, and consequences attributes are item-lists that contain the appropriate items from the subworkspace of the frame.

The frame-instantiation class is a container class for subclasses workframe-instantiation and factframe-instantiation. Its attributes include those shown in the following table 11.

TABLE 11

| | |
|---|---|
| serial-number | The is serial number of the instantiation. |
| related-workframe | The serial-number of the workframe to which it relates. |
| agent | The serial-number of the agent-or-object that holds the frame instantiation. |
| status | A symbol representing the state of the frame instantiation. |
| work-priority | An integer containing the derived priority of the frame instantiation. |
| uncompleted-activities, current-activity, completed-activities | Lists containing the primitive activities of the frame in various states. |
| activity-elapsed-time | The amount of time that the current activity has been worked on. |
| total-elapsed-time | The amount of time worked on this frame instantiation. |
| total-work-time | The total amount of time needed to work on all activities in this frame instantiation. |
| unchecked-detectables, checked-detectables | Detectables of the frame in various states. |
| unchecked-consequences, checked-consequences | Consequence of the frame in various states. |
| detectables-causing-impasse | When the frame instantiation is interrupted-with-impasse, this list contains the detectable(s) that caused the impasse. |

The primitive-activity class is used to define a lowest-level task (a primitive activity) within a workframe. Its attributes include task-time, the time that the activity will take during a simulation; and task-priority.

The invention has been described in terms of particular embodiments; however, it is not limited to those embodiments. Other embodiments are within the scope of the following claims.

What is claimed is:

1. A method of modeling behavior of a subject interacting with a world, the method comprising:

storing, in memory, a model having model elements including:

an agent modeling the subject and having one or more beliefs, a belief being a unit of information held and used internally by the agent;

one or more facts modeling objective, observable aspects of the world;

one or more frames for the agent to perform to model behavior of the subject, each frame being a workframe modeling time-consuming behavior by the subject or a thoughtframe modeling non-time-consuming reasoning by the subject, a workframe being considered active from the time the agent begins to the time the agent completes performing the workframe; and a detectable modeling acquisition of information and response to information by the subject, the detectable having an associated workframe and being operative during the whole or a specified portion of the time the detectable's associated workframe is active, the detectable having a fact template, where any facts matching the fact template are detected by the agent to form beliefs of the agent, whereby an agent obtains information while the associated workframe is active, and a detectable type defining the effect of an agent belief matching the detectable fact template during the time the detectable is operative and thereby satisfying the detectable.

2. The method of claim 1 wherein:

any conditions to be satisfied before the agent may begin performing a frame are defined as preconditions of the frame;

each workframe has a priority for comparison with priorities of other workframes; and the method further includes the step of running the model on the computer over a period of simulated time by selecting for each of the times in the period of simulated time one of the frames to be the working frame;

maintaining a context of active workframes, being workframes that have started but not completed or terminated working, the context representing what the subject is doing at any time in the simulation; and performing the working workframe until the working workframe completes or another workframe is selected to be performed in place of the working workframe.

3. The method of claim 2 wherein, in running the model, another workframe is selected when:

a detectable effect causes an impasse in the working workframe;

a detectable effect completes or aborts the working workframe; or a higher-priority workframe interrupts the working workframe.

4. The method of claim 2 wherein the model elements also include:

a detectable having a type causing performance of an associated workframe to be interrupted by an impasse until beliefs of the agent change.

5. The method of claim 2 wherein the model elements also include:

a detectable having a type causing performance of an associated workframe to be aborted; and a detectable associated with a workframe and having a type causing performance of the workframe to be completed by going directly to perform any consequences of the workframe.

6. The method of claim 2 wherein:

a first detectable associated with a first workframe is operative the entire time the first workframe is active; and a second detectable associated with a second workframe is operative a specified portion of the time the second workframe is active.

7. The method of claim 2 wherein:

the model elements also include a consequence associated with a frame, the consequence modeling changes in facts of the model or beliefs of the agent resulting from the behavior of the associated frame; and running the model also includes executing consequences of frames to change facts of the model or beliefs of the agent.

8. The method of claim 2 wherein the model elements also include:

a primitive activity, being an atomic activity-modeling construct that is not decomposed into other activities, the primitive activity having a time duration;

a composite activity, being an activity-modeling construct defined by one or more workframes; and a first workframe, the time-consuming behavior of which is defined by one or more primitive activities and one or more composite activities.

9. The method of claim 8 wherein:

the primitive activity has a time duration defined as a specific quantity or a random quantity; and the primitive activity has a priority used to calculate the priority of any workframe that includes the primitive activity.

10. The method of claim 8 wherein:

the primitive activity is defined as having a touched object, a touched object being a reference to an artifact object of the model, where having a touched object models that an artifact is touched in the course of performing the primitive activity, whereby the touched object is associated with the primitive activity and may be used for statistical purposes and generating object flows.

11. The method of claim 2 wherein the model elements also include:

a workframe having an activity of communicating a belief from one agent to another agent.

12. The method of claim 2 wherein the model elements also include:

a workframe having an activity of communicating a belief by broadcasting the belief.

13. The method of claim 2 wherein the model elements also include:

a workframe having preconditions and a do-once attribute set true, the workframe being performed only once for an agent for each distinct binding satisfying the workframe's preconditions.

14. The method of claim 8 wherein the model elements also include:

a detectable associated with a composite activity and having a type causing performance of the composite activity to be terminated when the detectable is satisfied.

15. The method of claim 8 wherein:

running the model is done by executing a simulation engine implementing semantics for primitive activities including primitive activities to communicate a belief and to create an artifact object.

16. The method of claim 2 wherein the model elements also include:

a geography defining locations in the modeled world and relationships between locations;

a fact of a location of the agent in the geography, where the agent has a correct belief as to the agent's location; and a workframe performing a primitive move activity having a goal location defined in the geography, the move activity causing an agent to move to the goal location if the agent is not already located at the goal location.

17. The method of claim 2 wherein the model elements also include:

groups representing functions performed by agents that are members of the groups, each group having group elements including any initial beliefs associated with the group's functions, any frames modeling behavior common to the function, and any membership in other groups from which initial beliefs, frames, or group membership are inherited;

where an agent member of a group inherits initial beliefs and frames from the group and all other groups of which the group is a member.

18. The method of claim 17 wherein:

a behavior of the agent is modeled by a group of which the agent is a member.

19. The method of claim 17 wherein the model elements also include:

a group modeling the habits of an agent with workframes having activities performed at regular times of day and days of the week; and a group modeling the expertise of an agent with workframes having activities modeling behavior requiring expertise.

20. The method of claim 17 wherein the model elements also include:
a general model of an activity, the general model having a first set of workframes having priorities in a high range and a second set of workframes having priorities in a middle range, the high range workframes modeling responses to impasse situations and the middle range workframes performing generic work of the general model, whereby the general model may be invoked by a workframe having a priority lower than the middle range.

21. The method of claim 2 wherein:
the facts include a time of day, a day of the week, and a day of the year; and
beliefs of the agent include a correct belief about the time of day.

22. The method of claim 2 wherein:
the agent has observable properties that are facts of the model.

23. The method of claim 2 wherein:
beliefs of an agent are part of an internal state of the agent and are represented as propositions asserted by the agent; and
preconditions of frames performed by an agent test only the beliefs of the agent.

24. The method of claim 2 wherein:
the agent is a model of a subject that is an interactive system selected from the group consisting of a person, a robot, an animal, or a computer-implemented process.

25. The method of claim 2 wherein the model elements also include:
an artifact object modeling a real thing in the world;
an internal state for an artifact object, the internal state including one or more beliefs, and
a factframe modeling behavior of the thing, the factframe having a precondition defining facts that must exist in the model before the artifact object may begin performing the factframe.

26. The method of claim 25 wherein the model elements also include:
a thoughtframe modeling information processing performed by an artifact object associated with the thoughtframe, the thoughtframe having associated with it preconditions to be satisfied before the thoughtframe may be performed;
a consequence associated with the thoughtframe and operating to assert a belief to model a deduction occurring when the preconditions of the thoughtframe are satisfied;
a detectable associated with a factframe and testing facts to have an effect that interrupts or aborts the behavior of the detectable's associated factframe; and
a consequence associated with a factframe and operating to assert a fact or a belief to model results of behaviors in the consequence's associated factframes.

27. The method of claim 25 wherein the model elements also include:
a frame having a primitive activity of communicating a belief between an agent and an artifact object; and
a frame having a primitive activity of communicating a belief between a first artifact object and a second artifact object.

28. The method of claim 25 wherein:
the model elements also include:
conceptual objects representing intangible concepts, and
an is-a-conceptual-object-of relation between a conceptual object and an artifact object; and
running the model also includes:
performing a create-object activity to create an new artifact object by copying an existing artifact object, where the new artifact object inherits the is-a-conceptual-object-of relations of the existing artifact object; and
generating concept statistics by tracking artifact objects linked by is-a-conceptual-object-of relation to conceptual objects.

29. The method of claim 28 wherein:
running the model also includes:
calculating a touch time of a conceptual object by calculating and summing the touch times of all artifact objects having an is-a-conceptual-object-of relation with the conceptual object; and
calculating a duration time of a conceptual object, duration time being a total time over which activities occur touching artifact objects having an is-a-conceptual-object-of relation with the conceptual object.

30. The method of claim 28 wherein:
running the model also includes displaying to a user through a computer interface a view of the running model providing a view of work flow in which activities of individual agents relating to a conceptual object are chained together to show the processing of work.

31. The method of claim 28 wherein:
running the model also includes displaying to a user through a computer interface views of the running model selected from the group including:
a view of social relations among agents defined by relations defined in the model;
a view of social relations among agents that emerge from social activities of agents involving other agents;
a view of locations of agents or artifact objects over simulated time in the geography;
a view of beliefs of agents over time;
a view of communications between or among agents or artifact objects;
a view of resource use showing use of resources including artifact objects and locations;
a view of information processing by artifact objects performing thoughtframes or factframes; and
a view of reasoning by agents performing thoughtframes or workframes.

32. A method of simulating the behavior of an interactive system in a world, comprising:
storing in computer memory a model having model elements including:
an agent modeling the interactive system, the agent having a state;
a fact representing a physical state of the world or an observable attribute of an agent;
workframes modeling behaviors of the agent, each workframe representing a behavior and having associated with it preconditions defining any conditions to be satisfied by a state of the model or the state of the agent before the agent may begin performing the behavior of the workframe; and detectables, each associated with a workframe, each detectable having a detectable condition being a fact template matching facts to be detected by an agent, which matching facts when detected form beliefs of the agent, the detection occurring while the associated workframe is active, whereby an agent obtains information while performing an activity, each detectable also having a detectable type defining the effect of an agent having a belief matching the detectable condition while the associated workframe is active; and running the model on the computer by:

assigning an initial state to each workframe in the model from a set of states including not-available;

selecting a behavior for the agent by selecting a workframe from among the workframes having states available, working, or interrupted and from among those workframes a workframe having a highest priority, the selected workframe being active from selection until completion or termination, the currently selected workframe being the working workframe;

changing workframe states by changing a state from not-available to available whenever all preconditions of the workframe are satisfied, changing a state from available to working whenever the workframe is selected to be the working workframe, changing a state from interrupted-with-impasse to interrupted whenever the detectable condition causing the impasse has ceased to be true, and changing a state from working to interrupted whenever a different, higher-priority available workframe is selected to be the behavior performed by the agent; and simulating the behavior defined in a selected workframe until the workframe has run to completion, at which occurrence the workframe state is changed to done and the workframe ceases to be active, until a detectable effect interrupts the workframe because of an impasse, at which occurrence the workframe state is changed to interrupted-with-impasse, until a detectable effect completes or aborts the workframe, at which occurrence the workframe ceases to be active, or until a higher-priority workframe is in an state of available or interrupted.

33. The method of claim 32 wherein the model elements also include:

a thoughtframe modeling reasoning performed by an agent associated with the thoughtframe, the thoughtframe having associated with it preconditions that must be satisfied before the thoughtframe may be performed; and a consequence associated with the thoughtframe and operating to assert beliefs to model a deduction occurring when preconditions of the thoughtframe are satisfied.

34. A method of providing services of an intelligent agent to a user, comprising:

storing a world model on a computer system to maintain a record of facts about the real world, including information about actions of the user;

storing an agent model modeling the user, the agent model having a general component, being a model of an idealized agent having the role or tasks of the user, and a situation-specific component, being a description of the state and the beliefs of the user;

running the agent model on a computer under the control of a comparator process both in a forward-looking mode to generate predictions and in an explanatory mode to compare predictions generated by the agent model with actions of the user, where the general component of the agent model stands in place of an expert system as a source of predictions for the comparator process;

receiving information about the real world including about actions of the user and adding the information to the world model during the running of the agent model;

transmitting differences, issues, or problems identified by the comparator process to an advisor process running on a computer; and running the advisor process to formulate differences, issues, or problems received from the comparator process and to provide them in the form of assistance or teaching to the user.

35. The method of claim 34 wherein:

the user is an interactive system selected from a person, a robot, an animal, or a computer-implemented process.

36. The method of claim 34 wherein:

the general component of the agent model includes workframes representing the role or tasks of the user as behaviors that in the aggregate define the idealized behavior of an agent representing the user in the agent model, where each workframe has associated with it a state having an initial value of not-available, a priority with respect to other workframes, and any preconditions to be satisfied before the workframe becomes available to be performed; and detectables associated with individual workframes and operating to be satisfied and cause an impasse to the continued performance of the associated workframe when some aspect of the state of the agent model matches a detectable condition while the associated workframe is active; and where running the agent model includes changing the state of each workframe:

from not-available to available whenever all preconditions of the workframe are satisfied;

from available to working whenever the workframe is selected to be performed, at which time the workframe becomes active;

from working to interrupted whenever a different, higher-priority workframe becomes available and is selected to be performed;

from available or interrupted to working whenever the workframe is the highest priority workframe among those in states available or interrupted;

from working to interrupted-with-impasse whenever a detectable condition is satisfied causing an impasse;

from interrupted-with-impasse to interrupted whenever the detectable condition causing the impasse has ceased to be true; and from any active state to done whenever a time duration of the workframe has run, at which occurrence the agent-workframe state is changed to done and the workframe is no longer active; and where running the agent model includes observing changes in the world model while the agent model is executing to identify changes by reason of which preconditions or detectables are satisfied.

37. The method of claim 36 wherein the general component of the model further includes:

consequences associated with individual workframes that change the state of the agent model to model results of activities performed by individual workframes.

38. The method of claim 36 wherein:
the comparator process applies explanation-based learning to modify the general component of the agent model to represent variations in practice.

39. The method of claim 36 wherein:
the information stored in the world model is obtained electronically from a database linked to the computer system; and
the computer system includes
a comparator computer operating to run the comparator process; and
a model computer operating to run the agent model.

40. The method of claim 36 wherein:
the user is a person; and
the computer system includes a personal digital assistant coupled to the comparator computer for information transfer by a wireless link, the personal digital assistant operating to communicate information between the user and the intelligent agent.

41. A computer program product, tangibly stored on a computer-readable medium, for modeling behavior of a subject interacting with a world, the program comprising instructions for causing a computer to:
store, in memory, a model having model elements including:
an agent modeling the subject and having one or more beliefs, a belief being a unit of information held and used internally by the agent;
one or more facts modeling objective, observable aspects of the world;
one or more frames for the agent to perform to model behavior of the subject, each frame being a workframe modeling time-consuming behavior by the subject or a thoughtframe modeling non-time-consuming reasoning by the subject, a workframe being considered active from the time the agent begins to the time the agent completes performing the workframe; and
a detectable modeling acquisition of information and response to information by the subject, the detectable having an associated workframe and being operative during the whole or a specified portion of the time the detectable's associated workframe is active, the detectable having a fact template, where any facts matching the fact template are detected by the agent to form beliefs of the agent, whereby an agent obtains information while the associated workframe is active, and a detectable type defining the effect of an agent belief matching the detectable fact template during the time the detectable is operative and thereby satisfying the detectable.

42. The product of claim 41 wherein:
any conditions to be satisfied before the agent may begin performing a frame are defined as preconditions of the frame;
each workframe has a priority for comparison with priorities of other workframes; and
the program further includes instructions to run the model on the computer over a period of simulated time by:
selecting for each of the times in the period of simulated time one of the frames to be the working frame;
maintaining a context of active workframes, being workframes that have started but not completed or terminated working, the context representing what the subject is doing at any time in the simulation; and
performing the working workframe until the working workframe completes or another workframe is selected to be performed in place of the working workframe.

43. The product of claim 42 wherein the model elements also include:
an artifact object modeling a real thing in the world;
an internal state for an artifact object, the internal state including one or more beliefs;
a factframe modeling behavior of the thing, the factframe having a precondition defining facts that must exist in the model before the artifact object may begin performing the factframe;
conceptual objects representing intangible concepts; and
an is-a-conceptual-object-of relation between a conceptual object and an artifact object; and
the instructions to run the model further include instructions to:
perform a create-object activity to create an new artifact object by copying an existing artifact object, where the new artifact object inherits the is-a-conceptual-object-of relations of the existing artifact object; and
generate concept statistics by tracking artifact objects linked by is-a-conceptual-object-of relation to conceptual objects.

44. The product of claim 43 wherein the instructions to run the model further include instructions to:
calculate a touch time of a conceptual object by calculating and summing the touch times of all artifact objects having an is-a-conceptual-object-of relation with the conceptual object; and
calculate a duration time of a conceptual object, duration time being a total time over which activities occur touching artifact objects having an is-a-conceptual-object-of relation with the conceptual object.

45. A computer program product, tangibly stored on a computer-readable medium, for simulating the behavior of an interactive system in a world, the program comprising instructions for causing a computer to:
store in computer memory a model having model elements including:
an agent modeling the interactive system, the agent having a state;
a fact representing a physical state of the world or an observable attribute of an agent;
workframes modeling behaviors of the agent, each workframe representing a behavior and having associated with it preconditions defining any conditions to be satisfied by a state of the model or the state of the agent before the agent may begin performing the behavior of the workframe; and
detectables, each associated with a workframe, each detectable having a detectable condition being a fact template matching facts to be detected by an agent, which matching facts when detected form beliefs of the agent, the detection occurring while the associated workframe is active, whereby an agent obtains information while performing an activity, each detectable also having a detectable type defining the effect of an agent having a belief matching the detectable condition while the associated workframe is active; and
run the model on the computer by:
assigning an initial state to each workframe in the model from a set of states including not-available;
selecting a behavior for the agent by selecting a workframe from among the workframes having states available, working, or interrupted and from among those workframes a workframe having a highest priority, the selected workframe being active from selection until completion or termination, the currently selected workframe being the working workframe;

changing workframe states by changing a state from not-available to available whenever all preconditions of the workframe are satisfied, changing a state from available to working whenever the workframe is selected to be the working workframe, changing a state from interrupted-with-impasse to interrupted whenever the detectable condition causing the impasse has ceased to be true, and changing a state from working to interrupted whenever a different, higher-priority available workframe is selected to be the behavior performed by the agent; and simulating the behavior defined in a selected workframe until the workframe has run to completion, at which occurrence the workframe state is changed to done and the workframe ceases to be active, until a detectable effect interrupts the workframe because of an impasse, at which occurrence the workframe state is changed to interrupted-with-impasse, until a detectable effect completes or aborts the workframe, at which occurrence the workframe ceases to be active, or until a higher-priority workframe is in an state of available or interrupted.

46. The product of claim 45 wherein the model elements also include:

a thoughtframe modeling reasoning performed by an agent associated with the thoughtframe, the thoughtframe having associated with it preconditions that must be satisfied before the thoughtframe may be performed; and a consequence associated with the thoughtframe and operating to assert beliefs to model a deduction occurring when preconditions of the thoughtframe are satisfied.

47. A computer program product, tangibly stored on a computer-readable medium, for providing services of an intelligent agent to a user, the program comprising instructions for causing a computer to:

store a world model on a computer system to maintain a record of facts about the real world, including information about actions of the user;

store an agent model modeling the user, the agent model having
  a general component, being a model of an idealized agent having the role or tasks of the user, and
  a situation-specific component, being a description of the state and the beliefs of the user;

run the agent model on a computer under the control of a comparator process both in a forward-looking mode to generate predictions and in an explanatory mode to compare predictions generated by the agent model with actions of the user, where the general component of the agent model stands in place of an expert system as a source of predictions for the comparator process;

receive information about the real world including about actions of the user and adding the information to the world model during the running of the agent model;

transmit differences, issues, or problems identified by the comparator process to an advisor process running on a computer; and run the advisor process to formulate differences, issues, or problems received from the comparator process and to provide them in the form of assistance or teaching to the user.

48. The product of claim 47 wherein:

the general component of the agent model includes
  workframes representing the role or tasks of the user as behaviors that in the aggregate define the idealized behavior of an agent representing the user in the agent model, where each workframe has associated with it a state having an initial value of not-available, a priority with respect to other workframes, and any preconditions to be satisfied before the workframe becomes available to be performed; and
  detectables associated with individual workframes and operating to be satisfied and cause an impasse to the continued performance of the associated workframe when some aspect of the state of the agent model matches a detectable condition while the associated workframe is active; and where running the agent model includes changing the state of each workframe:
  from not-available to available whenever all preconditions of the workframe are satisfied;
  from available to working whenever the workframe is selected to be performed, at which time the workframe becomes active;
  from working to interrupted whenever a different, higher-priority workframe becomes available and is selected to be performed;
  from available or interrupted to working whenever the workframe is the highest priority workframe among those in states available or interrupted;
  from working to interrupted-with-impasse whenever a detectable condition is satisfied causing an impasse;
  from interrupted-with-impasse to interrupted whenever the detectable condition causing the impasse has ceased to be true; and
  from any active state to done whenever a time duration of the workframe has run, at which occurrence the agent-workframe state is changed to done and the workframe is no longer active; and where running the agent model includes observing changes in the world model while the agent model is executing to identify changes by reason of which preconditions or detectables are satisfied.

* * * * *